United States Patent
Takei

(10) Patent No.: US 7,876,375 B2
(45) Date of Patent: Jan. 25, 2011

(54) FOCUSING DEVICE THAT ADJUSTS FOCUS BASED ON A MEASURED LUMINANCE VALUE AND METHOD FOR THE SAME

(75) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 11/370,770

(22) Filed: Mar. 7, 2006

(65) Prior Publication Data

US 2006/0152619 A1 Jul. 13, 2006

Related U.S. Application Data

(60) Continuation of application No. 11/185,577, filed on Jul. 19, 2005, now Pat. No. 7,024,107, which is a division of application No. 09/649,951, filed on Aug. 29, 2000, now Pat. No. 6,972,798.

(30) Foreign Application Priority Data

Aug. 31, 1999  (JP)  ................................ 11-245721

(51) Int. Cl.
   *G03B 13/00*  (2006.01)
   *H04N 5/232*  (2006.01)
(52) U.S. Cl. ........................ 348/349; 348/345; 348/356
(58) Field of Classification Search .................. 348/349
   See application file for complete search history.

(56) References Cited

U.S. PATENT DOCUMENTS 4,967,280 A    10/1990   Takuma et al.
5,126,849 A    6/1992    Senuma et al.
5,235,428 A    8/1993    Hirota et al.
5,257,058 A    10/1993   Mabuchi
5,311,238 A *  5/1994    Karasawa et al. ............. 396/78
5,442,397 A    8/1995    Yoshimura et al.
5,534,923 A    7/1996    Suda (Continued)

FOREIGN PATENT DOCUMENTS

JP      A 62-186214      8/1987

(Continued)

OTHER PUBLICATIONS

Office Action dated Mar. 9, 2004 of corresponding Japanese Patent Application 2000-262934.

*Primary Examiner*—Lin Ye
*Assistant Examiner*—Chia-Wei A Chen
(74) *Attorney, Agent, or Firm*—Canon U.S.A., Inc. I.P. Division

(57) ABSTRACT

An automatic focus adjustment device has an image sensing element for converting an object optical image into an electrical signal, and outputting an image signal, a filter for extracting high-frequency components of the image signal obtained by the image sensing element, an integrator for integrating the high-frequency components extracted by the filter and outputting an integrated value, a peak hold circuit for detecting and outputting a peak value of the high-frequency components extracted by the filter, a discrimination unit for discriminating the luminance distribution of the object optical image, and a focus adjustment unit for making focus adjustment using one of the integrated value output from the integrator and the peak value output from the peak hold circuit in accordance with the discrimination result.

10 Claims, 22 Drawing Sheets

U.S. PATENT DOCUMENTS

| | | |
|---|---|---|
| 5,604,538 A | 2/1997 | Kaneda et al. |
| 5,614,951 A | 3/1997 | Lee et al. |
| 5,877,809 A * | 3/1999 | Omata et al. ............... 348/345 |
| 5,923,371 A | 7/1999 | Iijima |
| 6,512,549 B1 | 1/2003 | Iijima et al. |
| 6,552,748 B1 * | 4/2003 | Sugimoto ................ 348/354 |
| 7,024,107 B2 * | 4/2006 | Takei ...................... 396/125 |
| 2005/0083428 A1 | 4/2005 | Ohkawara |

FOREIGN PATENT DOCUMENTS

| | | |
|---|---|---|
| JP | A 3-222583 | 10/1991 |
| JP | A 5-014796 | 1/1993 |
| JP | A 10-239581 | 9/1998 |

* cited by examiner

LUMINANCE SIGNAL (LA)

HIGH-PASS FILTER OUTPUT (LA)

LUMINANCE SIGNAL (LB)

HIGH-PASS FILTER OUTPUT (LB)

FOCUSING DEVICE THAT ADJUSTS FOCUS BASED ON A MEASURED LUMINANCE VALUE AND METHOD FOR THE SAME

This application is a continuation of prior application Ser. No. 11/185,577, filed Jul. 19, 2005, now U.S. Pat. No. 7,024,107 which is a divisional of application Ser. No. 09/649,951, filed Aug. 29, 2000, now issued U.S. Pat. No. 6,972,798, which issued on Dec. 6, 2005, the contents of which are hereby incorporated by reference in their entirety.

FIELD OF THE INVENTION

The present invention relates to a focusing device and method and, more particularly, to a focusing device and method, which are used in an image sensing apparatus such as a video camera, digital still camera, or the like, for setting an appropriate in-focus state.

BACKGROUND OF THE INVENTION

As a conventional automatic focus adjustment operation used in a video equipment such as a video camera or the like, a so-called "hill-climbing operation" is known. In this operation, a high-frequency component in an image signal obtained from an image sensing element such as a CCD is extracted, and focus adjustment is done by driving a focusing lens to maximize the high-frequency component. Since the focus adjustment system based on this "hill-climbing operation" makes focus detection based on the sharpness of an object image, it can accurately adjust the focus irrespective of the object distance, i.e., even when an object is located at a far or closest distance position.

As conventional auto-focusing (to be abbreviated to "AF" hereinafter) based on the hill-climbing operation, an integration AF method that integrates, within a predetermined distance measurement range of a frame, image signal components which have undergone a high-pass filter process for extracting a high-frequency component and uses an integrated signal in focusing control is prevalently used. Since the integration AF method integrates extracted high-frequency components within the distance measurement range and uses the integrated signal, it is excellent in AF stability, and can easily obtain an optimal in-focus point.

FIG. 14 is a block diagram showing an arrangement of a video camera system adopting the conventional integration AF method.

Referring to FIG. 14, reference numeral 101 denotes a stationary first lens group; 102, a zoom lens for zooming; 103, an iris for adjusting the quantity of light; and 104, a stationary second lens group. Reference numeral 105 denotes a focus compensation lens (to be referred to as a "focus lens" hereinafter) which has a function of compensating for movement of a focal plane upon zooming, and a focus adjustment function.

Reference numeral 106 denotes a CCD as an image sensing element. Reference numeral 107 denotes a CDS/AGC which performs sample-and-hold operation and amplifies the output from the CCD 106, and the gain of which is adjusted by a signal from a camera controller (microcomputer) 114 to be described later. Reference numeral 108 denotes an A/D converter for converting an analog signal from the CDS/AGC 107 into a digital signal; and 109, a camera signal processing circuit. The output signal from the camera signal processing circuit 109 is recorded on a recording medium such as a magnetic tape, memory, or the like (not shown).

Reference numeral 110 denotes a timing signal generator for supplying various drive pulses and timing pulses to the respective sections of the camera, such as the CCD 106, CDS/AGC 107, and the like.

Reference numeral 111 denotes a zoom lens driver for driving the zoom lens 102; 112, an iris driver for driving the iris 103; and 113, a focus lens driver for driving the focus lens 105. The drivers 111 to 113 respectively drive motors included therein in accordance with signals from the camera controller 114.

Reference numeral 120 denotes a focus evaluation value processor, which has a high-pass filter 121 for extracting a predetermined high-frequency component from a luminance signal output from the A/D converter 108, a distance measurement range gate 122 for extracting only signal components within a predetermined distance measurement range from a frame, a line peak hold circuit 123 for holding peaks of the signal components extracted by the distance measurement range gate 122 in units of horizontal scan lines, and an integrator 124 for integrating peak values of the peak-held scan lines. The integrated value is called an "integrated focus evaluation value".

The value of the integrator 124 is reset for each frame, and the integrator 124 can compute the integrated focus evaluation value for each frame. The integrated focus evaluation value is input to the camera controller 114, which drives the focus lens 105 via the focus lens driver 113 to maximize the integrated focus evaluation value.

In the prior art, the peak values of the peak-held scan lines are integrated. Alternatively, the signal components may be integrated without holding peaks, or peak values may be held in units of a plurality of horizontal scan lines, and the held values may be integrated.

The output luminance signal from the A/D converter 108 is also input to an exposure evaluation value processor 130, which generates an evaluation value for controlling exposure from signal components of a frame and supplies it to the camera controller 114. The camera controller 114 drives the iris 103 based on the exposure evaluation value to obtain an optimal exposure value. A key unit 115 is connected to the camera controller 114, and various kinds of key operation information of the camera unit such as a zoom key for operating the zoom lens 102 and the like are output to the camera controller 114. For example, when the user has pressed the zoom key, the camera controller 114 drives the zoom lens 102 via the zoom lens driver 111 to obtain a desired zoom ratio (focal length).

However, since the integration AF method controls to obtain the highest average contrast within a frame, although no problem is posed for a normal object focusing performance impairs for an image of a high-luminance object or a point light source in a night scene (to be referred to as a "peak image" hereinafter).

FIG. 15 shows an example of the integrated focus evaluation value of a normal object, and FIG. 16 shows an example of the integrated focus evaluation value of a peak image. In the normal object, since an in-focus point and a peak value of the integrated focus evaluation value appear at an identical position P0, as shown in FIG. 15, and no problem is posed. However, in the peak image, an in-focus point and a peak of the integrated focus evaluation value do not appear at the same position, and the peak of the integrated focus evaluation value appears at a slightly offset focus lens position PB, as shown in FIG. 16.

In case of an image of a point light source in a night scene as a typical peak image, the integrated focus evaluation value assumes a larger value in an out-of-focus state shown in FIG.

18 than a perfect in-focus state shown in FIG. 17. Note that FIGS. 17 and 18 show examples of images that appear on the frame upon sensing a peak image. In this manner, a peak of the integrated focus evaluation value appears at a focus lens position offset from an actual in-focus point. In such case, since the camera controller 114 controls the focus lens 105 to a position where the integrated focus evaluation value has a peak, the focus lens 105 is controlled to the focus lens position PB shown in FIG. 16. As a result, the obtained image is out of focus.

As an alternative to the integration AF method, a peak AF method that uses a maximum peak value within a predetermined distance measurement range from luminance signal components of a frame that has undergone a high-pass filter process for extracting high-frequency components is known. FIG. 19 is a block diagram showing the arrangement of a video camera system that adopts the conventional peak AF method.

The video camera shown in FIG. 19 has substantially the same arrangement as that of the video camera shown in FIG. 14, except that the arrangement of the focus evaluation value processor 120 is modified to obtain the maximum value of high-frequency components of the luminance signal within the distance measurement range. Referring to FIG. 19, the maximum value of high-frequency components of the luminance signal within the distance measurement range, which is output from a focus evaluation value processor 120' is called a "peak focus evaluation value".

FIG. 20 shows a peak focus evaluation value in a peak image which is hard to focus upon adjustment by integration AF. For the purpose of comparison with integration AF, FIG. 20 also shows the integrated focus evaluation value. As can be seen from FIG. 20, the peak focus evaluation value becomes maximal at a correct in-focus point even in a peak image. FIGS. 21A and 21B respectively show a luminance signal for one horizontal line of a portion indicated by LA in FIG. 17, and the output of a high-pass filter of an in-focus image of a point light source. FIGS. 22A and 22B respectively show a luminance signal for one horizontal line of a portion indicated by LB in FIG. 18, and the output of a high-pass filter of an out-of-focus image of a point light source.

In this manner, even in a peak image with a saturated luminance signal, since in-focus and out-of-focus images have different leading edges of luminance signals, the output from the high-pass filter differs in correspondence with these images, thus allowing correct in-focus point detecting. In the peak AF method, a correct in-focus point can be detected in a peak image.

However, since the peak focus evaluation value is smaller than the integrated focus evaluation value, the peak AF method has poor stability for a normal object compared to the integration AF method, and AF often becomes unstable under the influence of, e.g., panning.

Since it is controlled to obtain the highest average contrast within a frame in the integration AF method, no problem is posed in a normal object, but focusing performance impairs in a peak image.

SUMMARY OF THE INVENTION

The present invention has been made in consideration of the above situation, and has as its object to provide an automatic focus adjustment device and method which can accurately detect an in-focus point for not only a normal image but also a peak image.

According to the present invention, the foregoing object is attained by providing an apparatus comprising: (A) a photo-receiving device for receiving light from an object and converting it into an electrical signal; and (B) a focus adjusting device for forming a first adjustment signal by performing a predetermined integration operation on a predetermined frequency component of an image signal obtained by the photo-receiving device and forming a second focus adjustment signal, different from the first focus adjustment signal, from a peak value of a predetermined frequency component of the image signal obtained by the photo-receiving device, wherein the focus adjustment apparatus applies at least one of the first and second focus adjustment signals to focus adjustment on the basis of a luminous state of the object.

Further, the foregoing object is also attained by providing an apparatus comprising: (A) a photo-receiving device for receiving light from an object; and (B) a focus adjusting device performing an operation for focus adjustment, wherein the focus adjusting device performs the operation depending upon determination whether or not an object image has a luminous state judged as a peak image from a photo-received signal on the basis of the photo-receiving device.

Furthermore, the foregoing object is also attained by providing a focus adjusting method comprising: converting light from an object into an image signal, forming a first adjustment signal by performing a predetermined integration operation on a predetermined frequency component of the image signal, forming a second focus adjustment signal, different from the first focus adjustment signal, from a peak value of a predetermined frequency component of the image signal, applying at least one of the first and second focus adjustment signal to focus adjustment on the basis of a luminous state of the object.

Further, foregoing object is also attained by providing a focus adjusting method comprising: performing an operation for focus adjustment depending upon determination whether or not an object image has a luminous state judged as a peak image on the basis of a photo-received signal of light of the object.

Further, foregoing object is also attained by providing a computer program product comprising: converting light from an object into an image signal, forming a first adjustment signal by performing a predetermined integration operation on a predetermined frequency component of the image signal; forming a second focus adjustment signal, different from the first focus adjustment signal, from a peak value of a predetermined frequency component of the image signal, applying at least one of the first and second focus adjustment signal to focus adjustment on the basis of a luminous state of the object.

Further, foregoing object is also attained by A computer program product comprising: performing an operation for focus adjustment depending upon determination whether or not an object image has a luminous state judged as a peak image on the basis of a photo-received signal of light of the object.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

The first embodiment of the present invention will be described first with reference to FIGS. 1 to 3.

Figure 1:
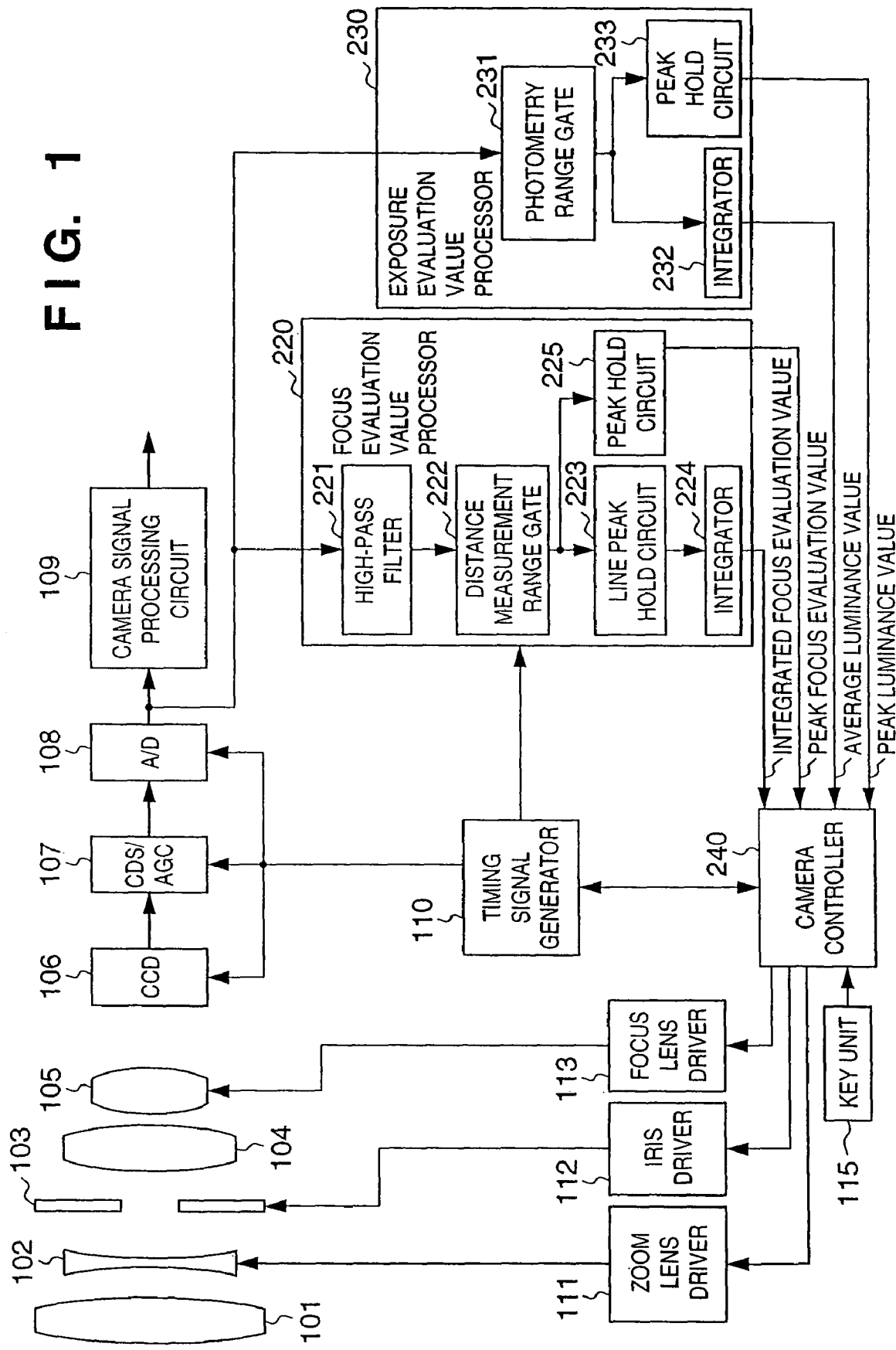
FIG. 1 is a block diagram showing an arrangement of a video camera system that adopts a focus adjustment method according to a first embodiment of the present invention.
Figure 14:
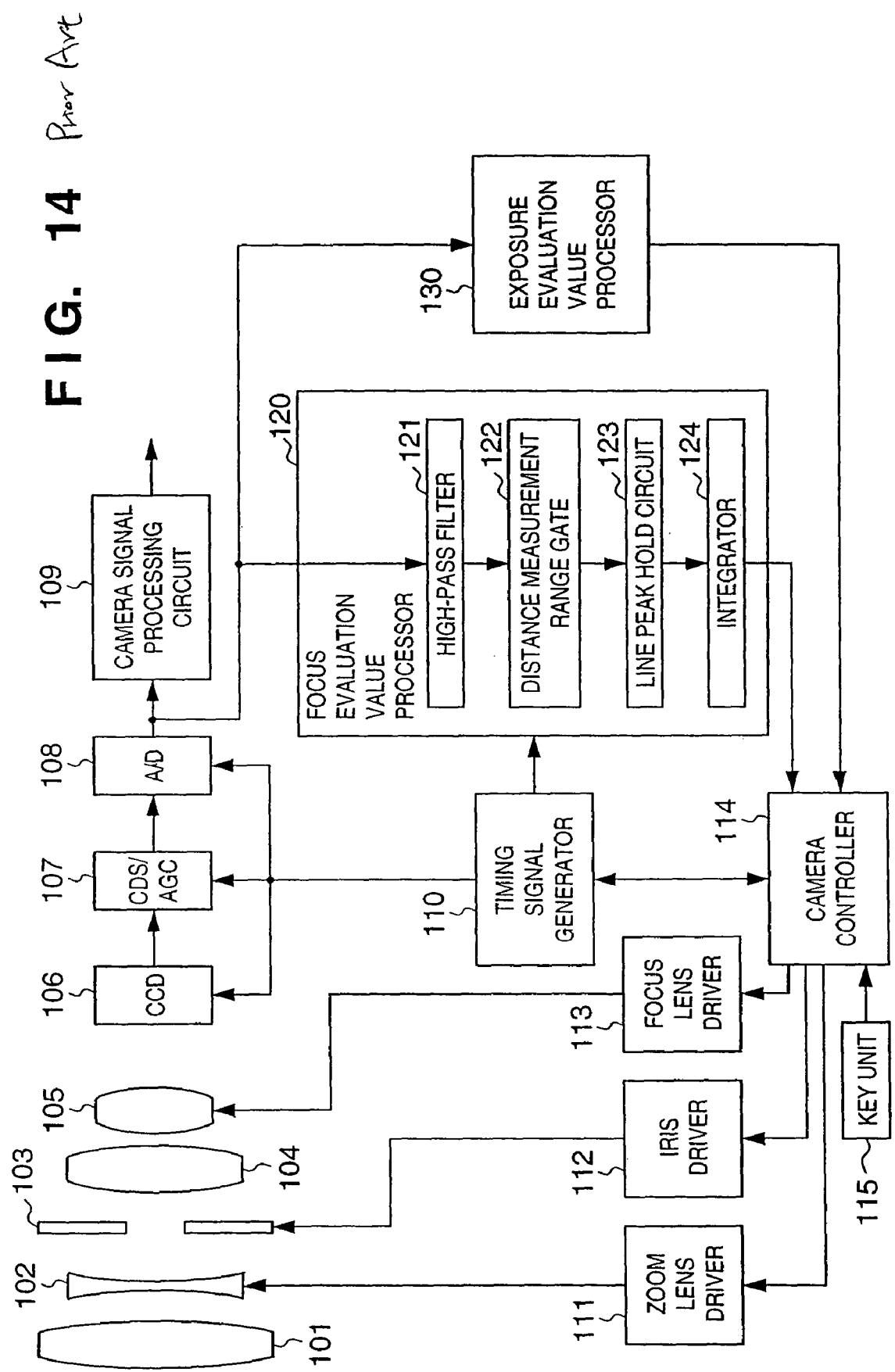
FIG. 14 is a block diagram showing an arrangement of a video camera system that adopts the conventional integration AF method.
Figure 15:
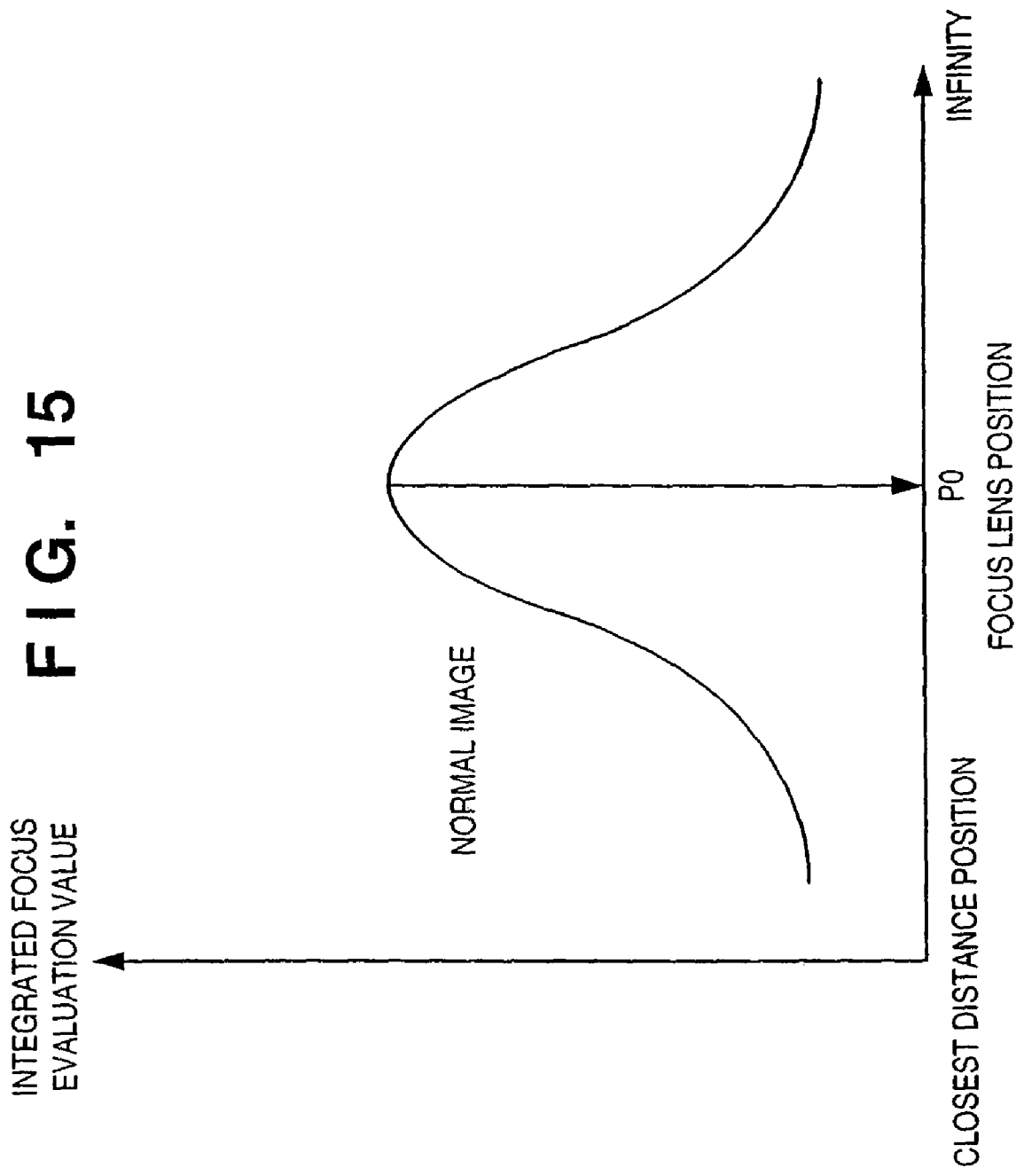
FIG. 15 is a graph showing an example of an integrated focus evaluation value in a normal object.
Figure 16:
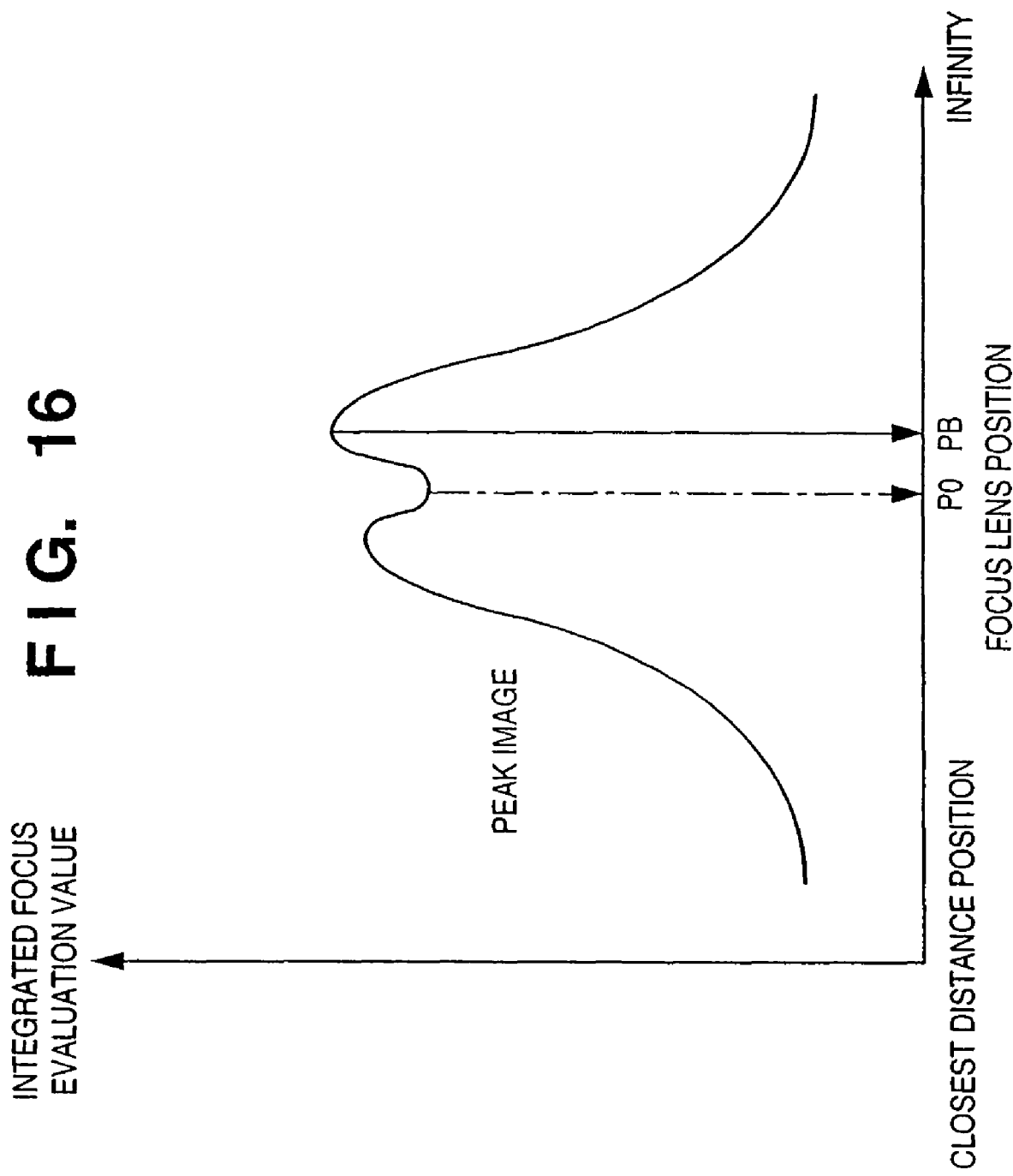
FIG. 16 is a graph showing an example of an integrated focus evaluation value in a peak image.
Figure 17:
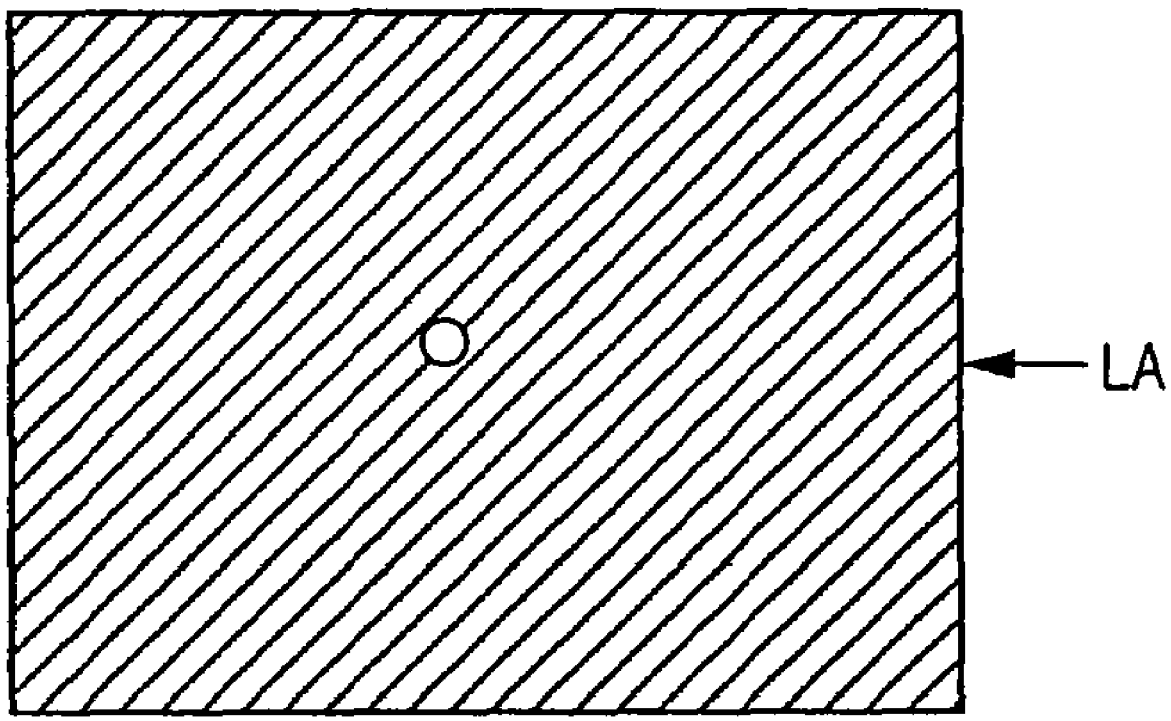
FIG. 17 is a view showing an example of an image that appears on a frame upon sensing a peak image.
Figure 18:
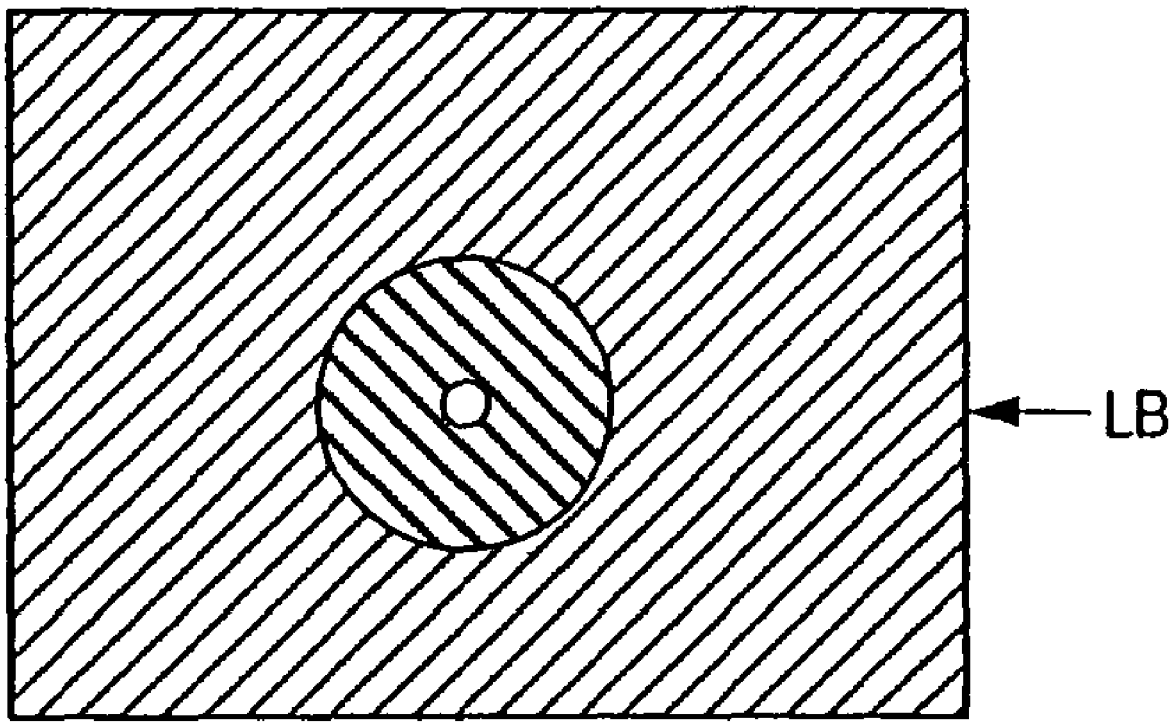
FIG. 18 is a view showing an example of an image that appears on a frame upon sensing a peak image.
Figure 19:
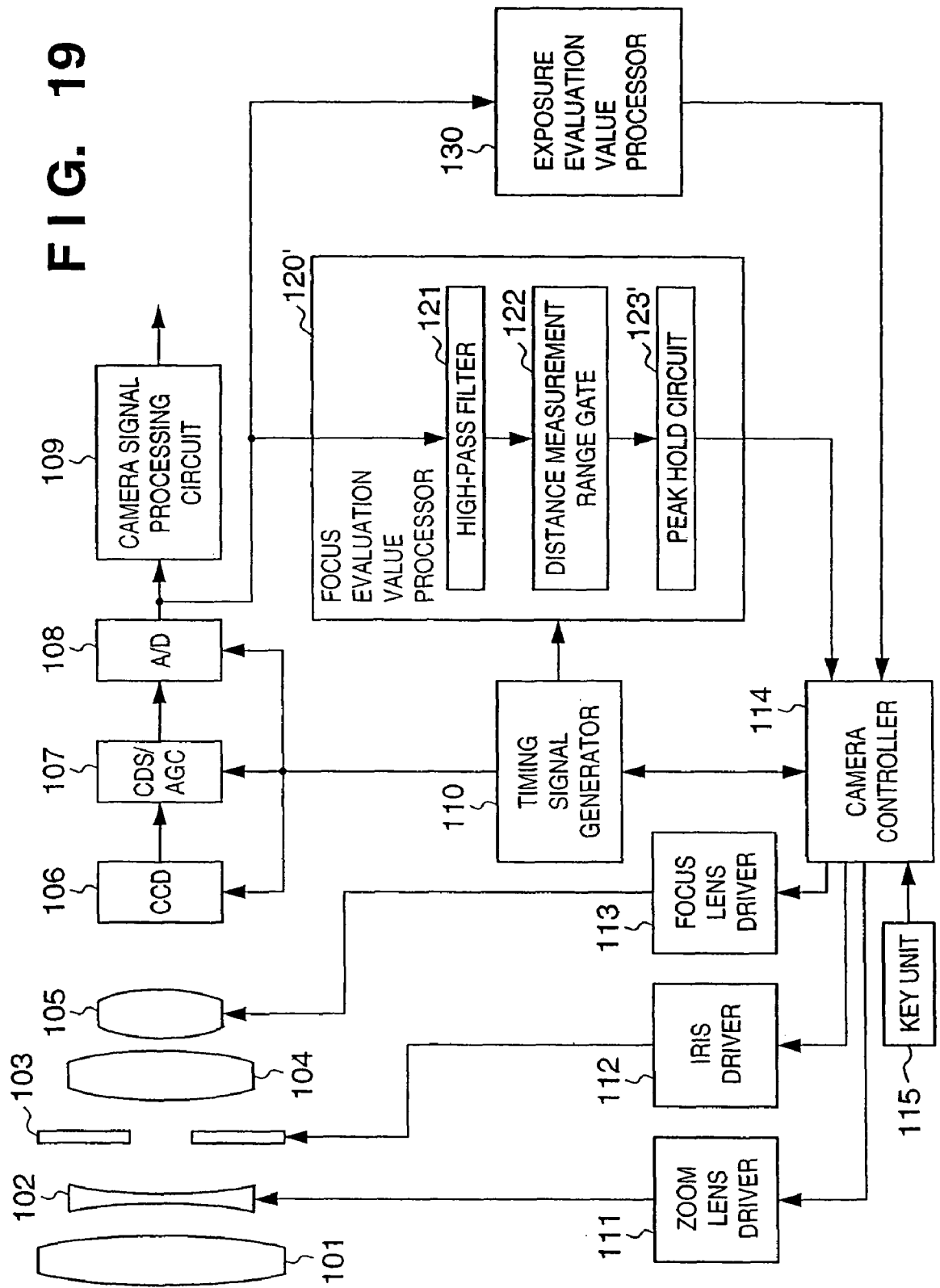
FIG. 19 is a block diagram showing an arrangement of a video camera system that adopts the conventional peak AF method.
Figure 20:
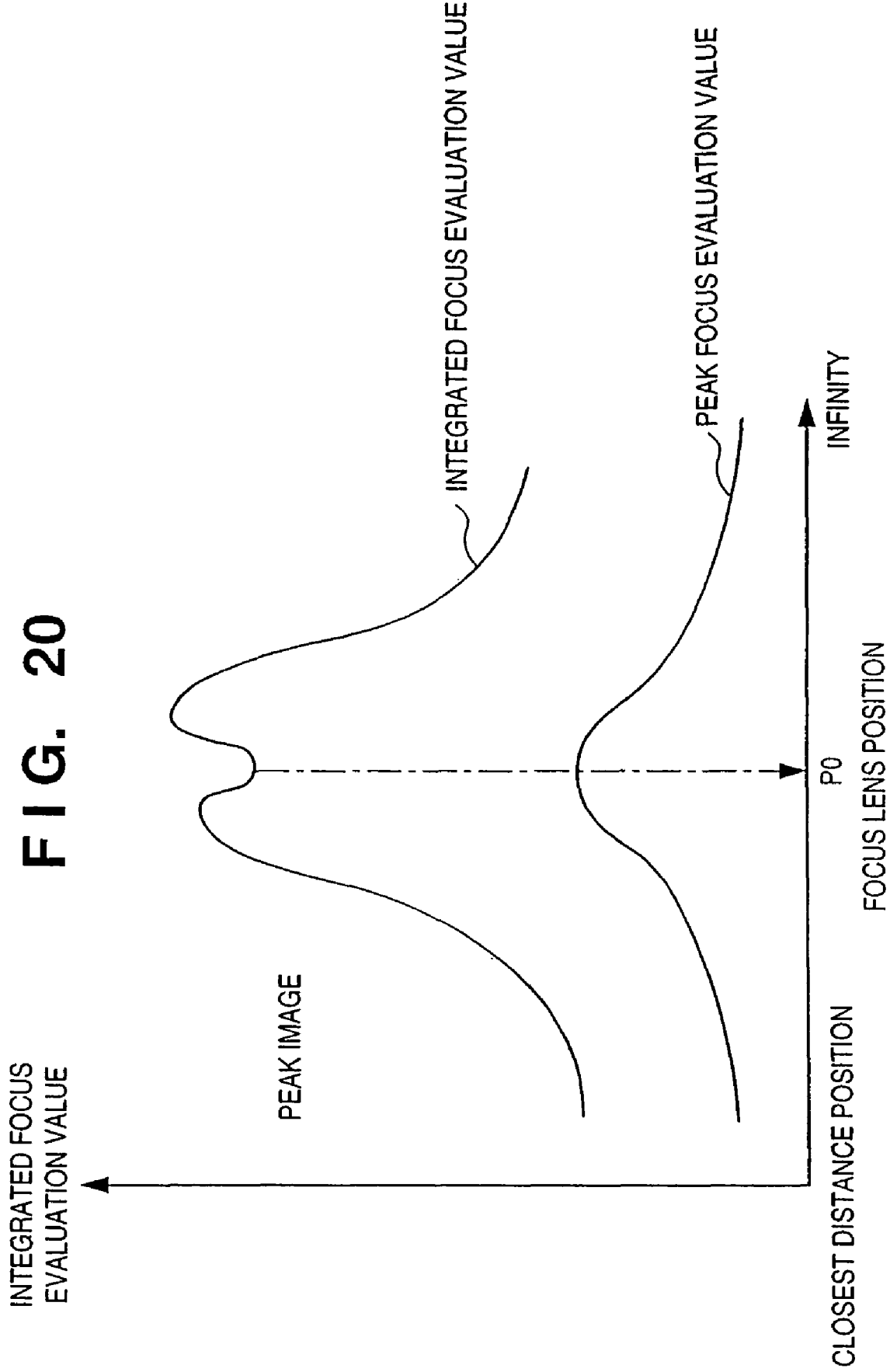
FIG. 20 is a graph showing an example of a peak focus evaluation value in a peak image.
Figure 21A:
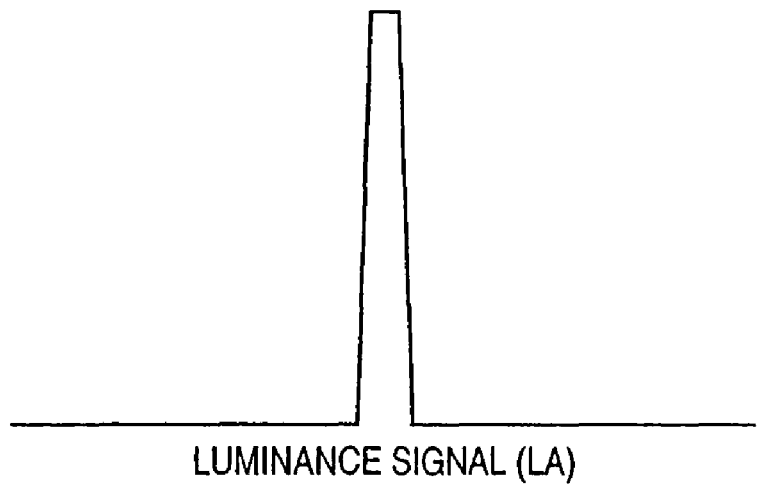
FIGS. 21A and 21B are graphs respectively showing the luminance signal for one horizontal line, and the output from a high-pass filter.
Figure 21B:
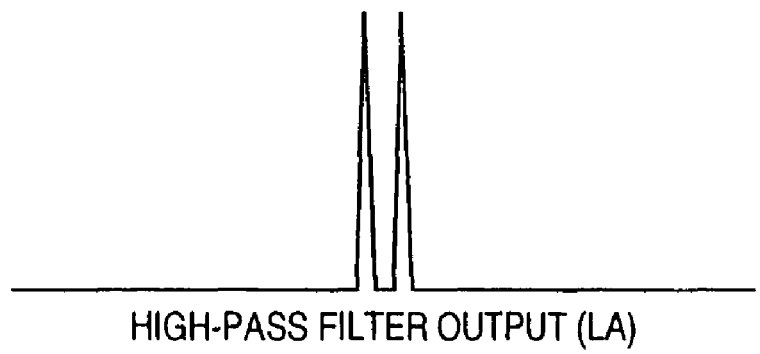
Figure 22A:
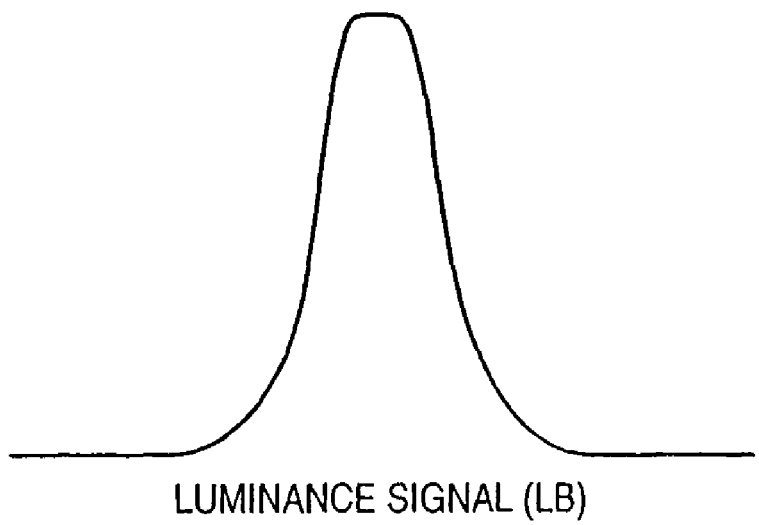
FIGS. 22A and 22B are graphs respectively showing the luminance signal for one horizontal line, and the output from a high-pass filter.
Figure 22B:
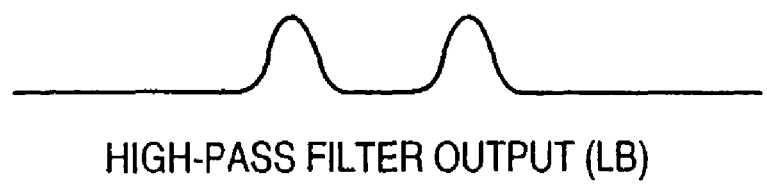

FIG. 1 is a block diagram showing an arrangement of a video camera system that adopts a focus adjustment method according to the first embodiment. The same reference numeral in FIG. 1 denote the same parts as in the arrangement of the conventional video camera system shown in FIG. 14, and a detailed description thereof will be omitted. A characteristic feature of the video camera system in the first embodiment lies in operations of a focus evaluation value processor 220 capable of outputting an integrated focus evaluation value and peak focus evaluation value, an exposure evaluation value processor 230 capable of outputting the average and peak luminance values of a frame, and a camera controller 240 which receives these values.

A luminance signal which is output from an A/D converter 108 and input to the focus evaluation value processor 220 undergoes a process for extracting a predetermined high-frequency component from the luminance signal by a high-pass filter 221. Then, a distance measurement range gate 222 executes a process for extracting only signal components within a predetermined distance measurement range from a frame. A line peak hold circuit 223 holds peaks of the extracted signal components in units of horizontal scan lines. An integrator 224 integrates peak values in units of scan lines within the distance measurement range, and outputs an integrated focus evaluation value. The output from the distance measurement range gate 222 is also input to a peak hold circuit 225 to extract the maximum high-frequency component within the distance measurement range. This value is called a peak focus evaluation value. The values of the integrator and peak hold circuit are reset for each frame, and the integrated focus evaluation value and peak focus evaluation value for each frame can be output to the camera controller 240.

The exposure evaluation value processor 230 executes a process for extracting only a signal within a predetermined photometry range from a frame using a photometry range gate 231 with respect to the luminance signal input from the A/D converter 108. The luminance signal extracted by the photometry range gate 231 is input to an integrator 232, which outputs an average luminance signal obtained by summing up and averaging luminance signal components in the photometry range to the camera controller 240. Also, the luminance signal extracted by the photometry range gate 231 is input to a peak hold circuit 233, which outputs a maximum luminance signal within the photometry range to the camera controller 240.

Figure 2:
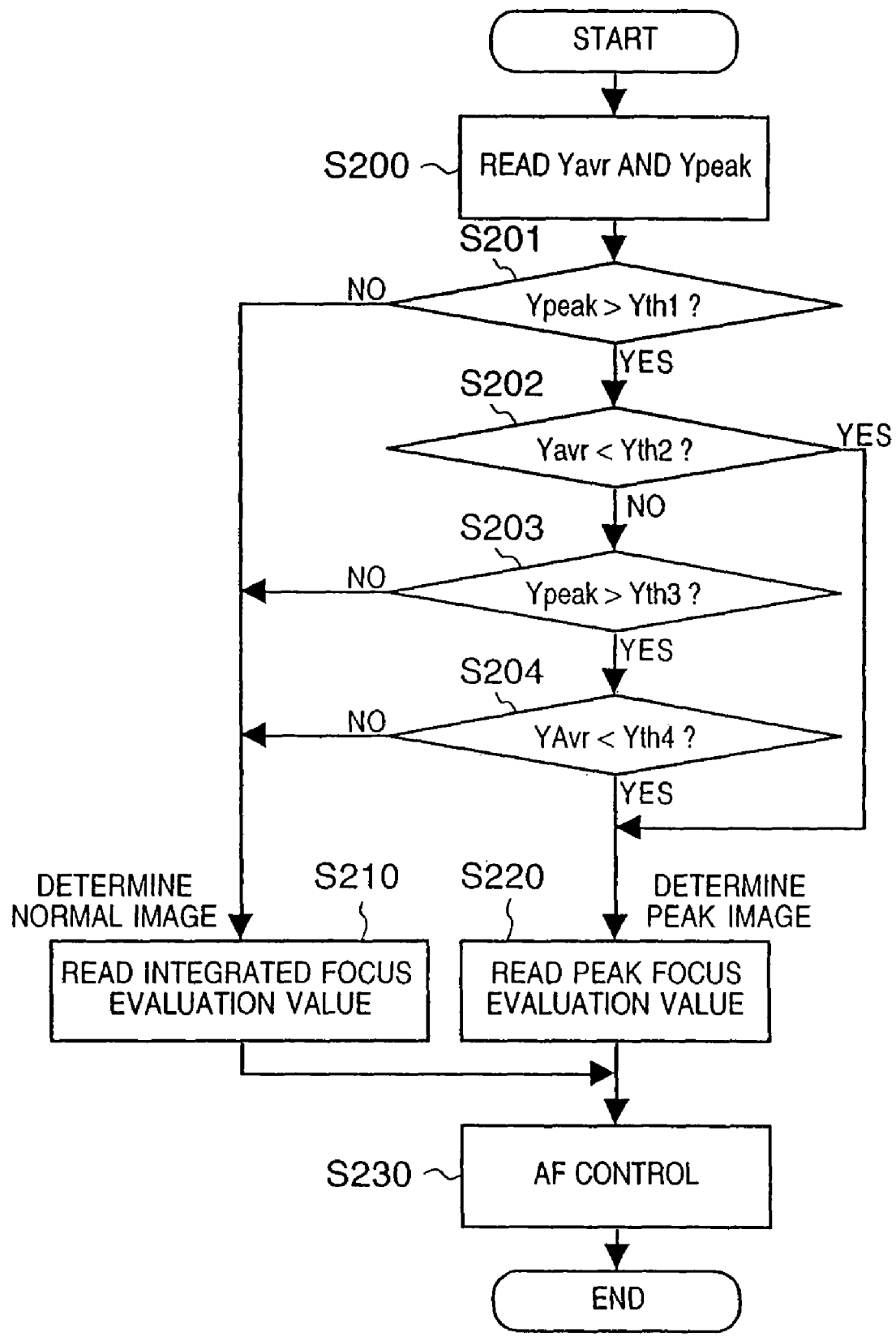
FIG. 2 is a flow chart showing a focus adjustment control sequence executed by a camera controller according to the first embodiment of the present invention.
Figure 3:
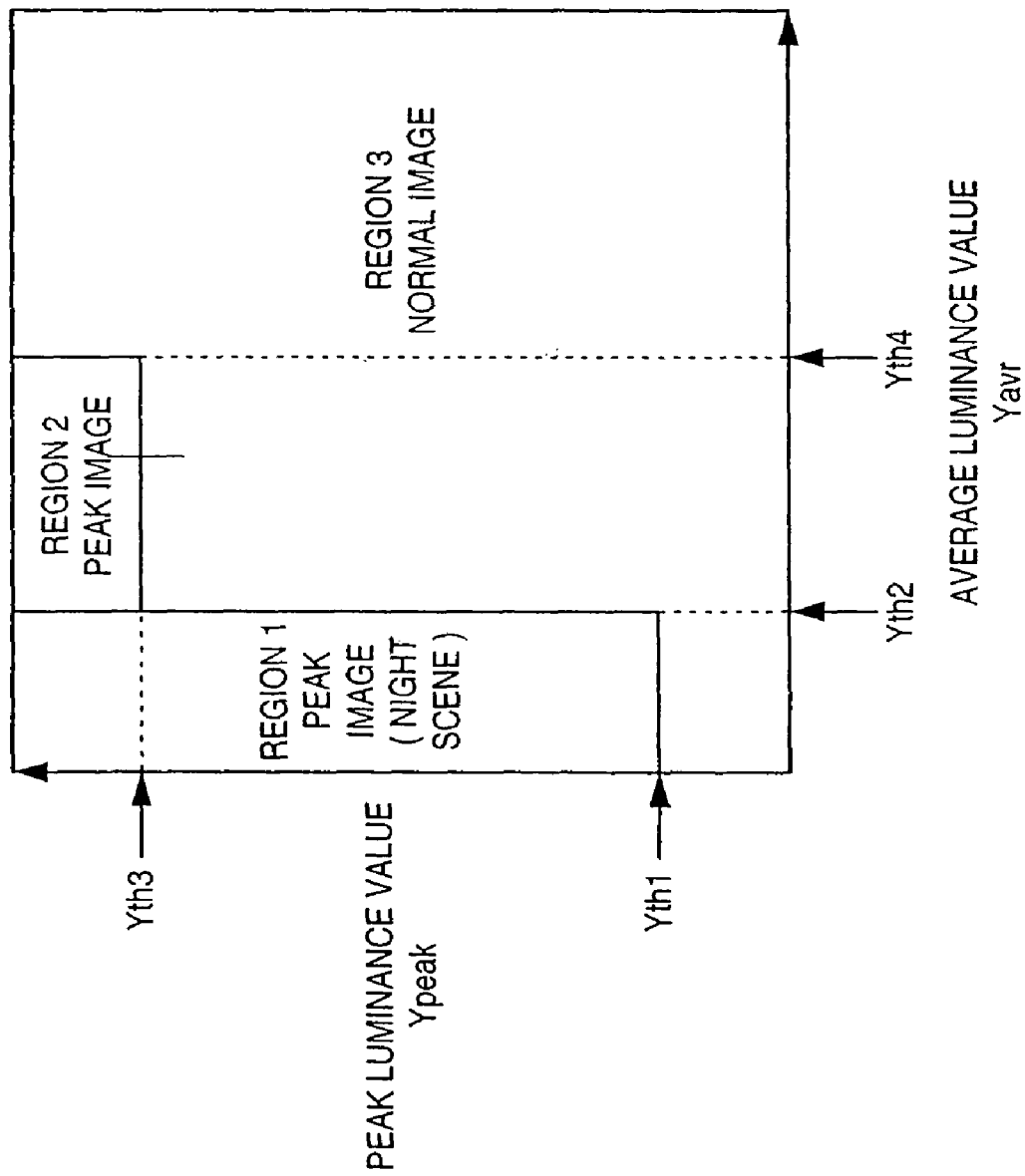
FIG. 3 is a graph for explaining a peak image discrimination scheme according to the first embodiment of the present invention.

FIG. 2 is a flow chart showing the AF focus adjustment control sequence executed by the camera controller 240 using these input signals.

An average luminance value Yavr and peak luminance value Ypeak are read (step S200), and it is checked if the peak luminance value Ypeak is higher than a predetermined value Yth1 (step S201). If the peak luminance value Ypeak is lower than the predetermined value Yth1, the object is unlikely to be a high-luminance object or point light source, and it is determined that the object is a normal image. Hence, a process for reading the integrated focus evaluation value output from the integrator 224 is executed (step S210).

On the other hand, if it is determined in step S201 that the peak luminance value Ypeak is higher than the predetermined value Yth1, it is checked if the average luminance value Yavr output from the integrator 232 is very low, i.e., if the average luminance value Yavr is lower than a predetermined value Yth2 (step S202). If average luminance value Yavr is lower than the predetermined value Yth2, since it is determined that the object is a peak image (night scene or the like), a process for reading a peak focus evaluation value output from the peak hold circuit 225 is executed (step S220). FIG. 3 is an explanatory view showing an example of a peak image discrimination scheme based on the average luminance value Yavr and peak luminance value Ypeak. A condition that the peak luminance value Ypeak is not low in step S201 and the average luminance value Yavr is very low in step S202 corresponds to region 1 shown in FIG. 3.

If it is determined in step S202 that the average luminance value Yavr is not lower than the predetermined value Yth2, it is checked if the peak luminance value Ypeak is very high, i.e., it is higher than a predetermined value Yth3 (Yth3>Yth1) (step S203). If the peak luminance value Ypeak is higher than the predetermined value Yth3, it is checked if the average luminance value Yavr is lower than a predetermined value Yth4 (Yth4>Yth2) (step S204).

If it is determined in step S204 that the average luminance value Yavr is lower than the predetermined value Yth4, i.e., if the peak luminance value Ypeak is very high and the average luminance value Yavr is low to some extent, it is determined that the object is a peak image such as an image of sunbeams coming through branches of trees or the like, and the process for reading a peak focus evaluation value is executed in step S220. This condition corresponds to region 2 shown in FIG. 3.

When the object does not satisfy the condition of region 1 or 2, i.e., if the peak luminance value Ypeak is low (NO in step S201 or S203) or both the average luminance value Yavr and peak luminance value Ypeak are high (NO in step S204), it is determined that the object is a normal image, and the process for reading the integrated focus evaluation value is executed in step S210. The condition of the normal image corresponds to region 3 in FIG. 3.

It is checked based on the average luminance value Yavr and peak luminance value Ypeak in the aforementioned sequence if the object is a peak or normal image. If it is determined that the object is a normal image, an AF process is done using the integrated focus evaluation value; otherwise, an AF process is done using a peak focus evaluation value (step S230).

In this manner, in case of an object such as a night scene, point light source, or the like (peak image) that poses a problem in the conventional integration AF method, correct focus adjustment control can be done using the peak focus evaluation value. In case of a normal image, since focus adjustment control is done based on the integrated focus evaluation value, stable focus adjustment can be made.

Since an object is discriminated in this manner, and AF control optimal to each object is done, a system which has merits of both the integration and peak AF methods can be implemented. That is, according to the first embodiment, correct focus adjustment can be done not only in a normal image but also in a peak image.

Second Embodiment

The second embodiment of the present invention will be described below with reference to FIGS. 4 and 5.

The second embodiment is characterized in that a peak image is discriminated based on a luminance signal using a scheme different from that in the first embodiment.

Figure 4:
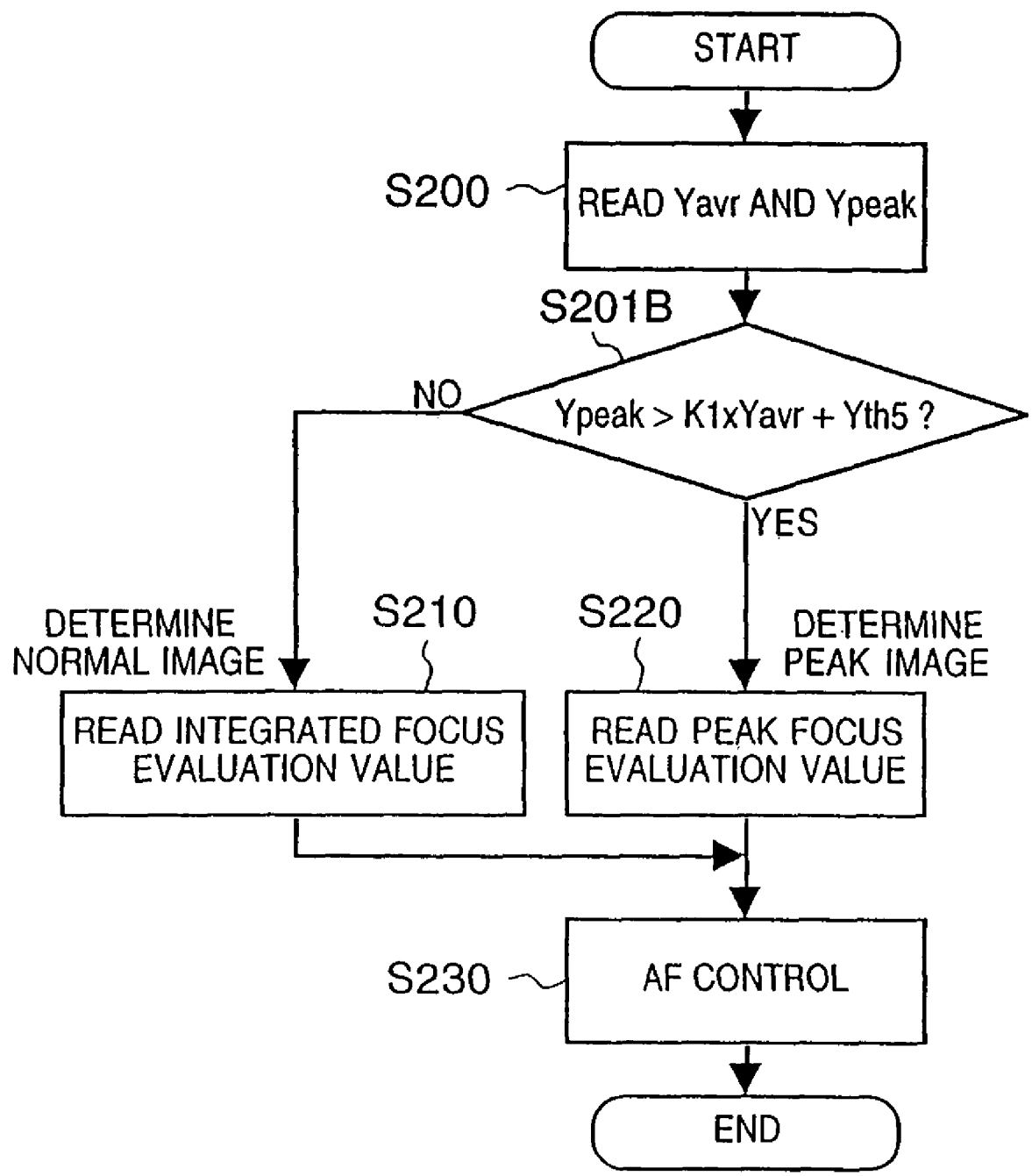
FIG. 4 is a flow chart showing a focus adjustment control sequence according to the second embodiment of the present invention.
Figure 5:
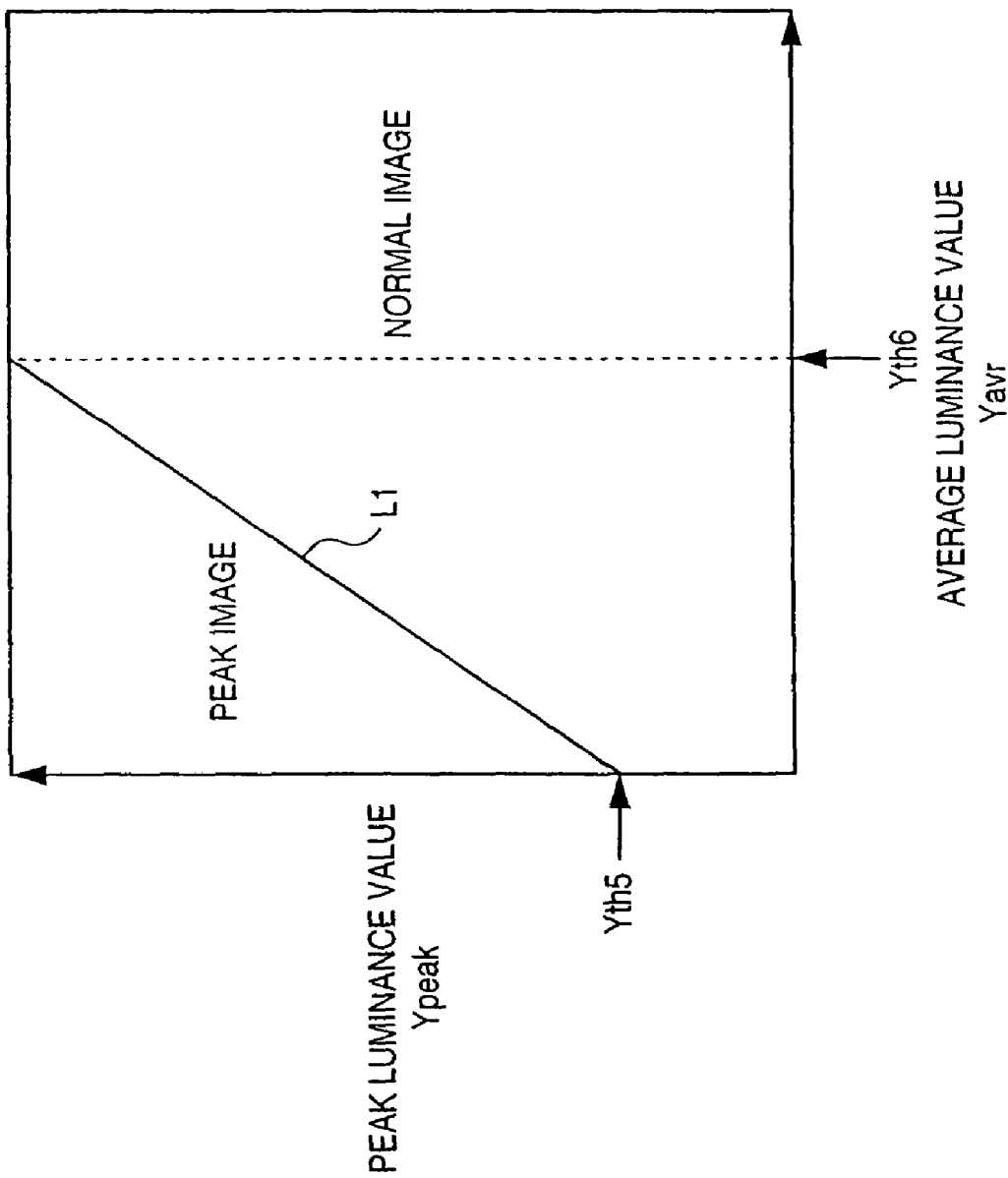
FIG. 5 is a graph for explaining a peak image discrimination scheme according to the second embodiment of the present invention.

FIG. 4 is a flow chart showing the focus adjustment control sequence according to the second embodiment of the present invention, and FIG. 5 is an explanatory view showing the peak image discrimination scheme. In FIG. 4, the sequence in step S200 and steps S210 to S230 is the same as those in FIG. 2.

An average luminance value Yavr and peak luminance value Ypeak are read in step S200, and it is checked in step S201B if the peak luminance value Ypeak and average luminance value Yavr satisfy:

$$Ypeak > K1 \times Yavr + Yth5 \quad (1)$$

where the coefficient K1 is the ratio between the peak luminance value Ypeak and average luminance value Yavr, and corresponds to the slope of a straight line L1 in FIG. 5. Also, the predetermined value Yth5 is an offset of the straight line L1, and corresponds to Yth5 in FIG. 5. In the second embodiment, if the peak luminance value is expressed by 8-bit data, since the maximum level is 255, the slope K1 is given by:

$$K1 = (255 - Yth5)/Yth6 \quad (2)$$

The relationship that satisfies this condition corresponds to a peak image region shown in FIG. 5. An object within this region undergoes an AF process using a peak focus evaluation value. On the other hand, if this condition is not satisfied, it is determined that the object is a normal image, and an AF process is done using an integrated focus evaluation value.

As described above, according to the second embodiment, since the peak focus evaluation value is used in focus adjustment control for an object such as a night scene, point light source, or the like (peak image) that poses a problem in the conventional integration AF method, accurate focus adjustment is done even in a peak image. Since the integrated focus evaluation value is used in focus adjustment control for a normal image, stable focus adjustment can be assured.

Third Embodiment

The third embodiment of the present invention will be described below with reference to FIGS. 6 and 7.

The third embodiment is characterized in that a peak image is discriminated based on a luminance signal using a scheme different from that in the first and second embodiments.

The third embodiment uses the ratio between the average luminance value Yavr and peak luminance value Ypeak and offset as conditions as in the second embodiment, but is different from the scheme of the second embodiment in that a plurality of ratios are used.

Figure 6:
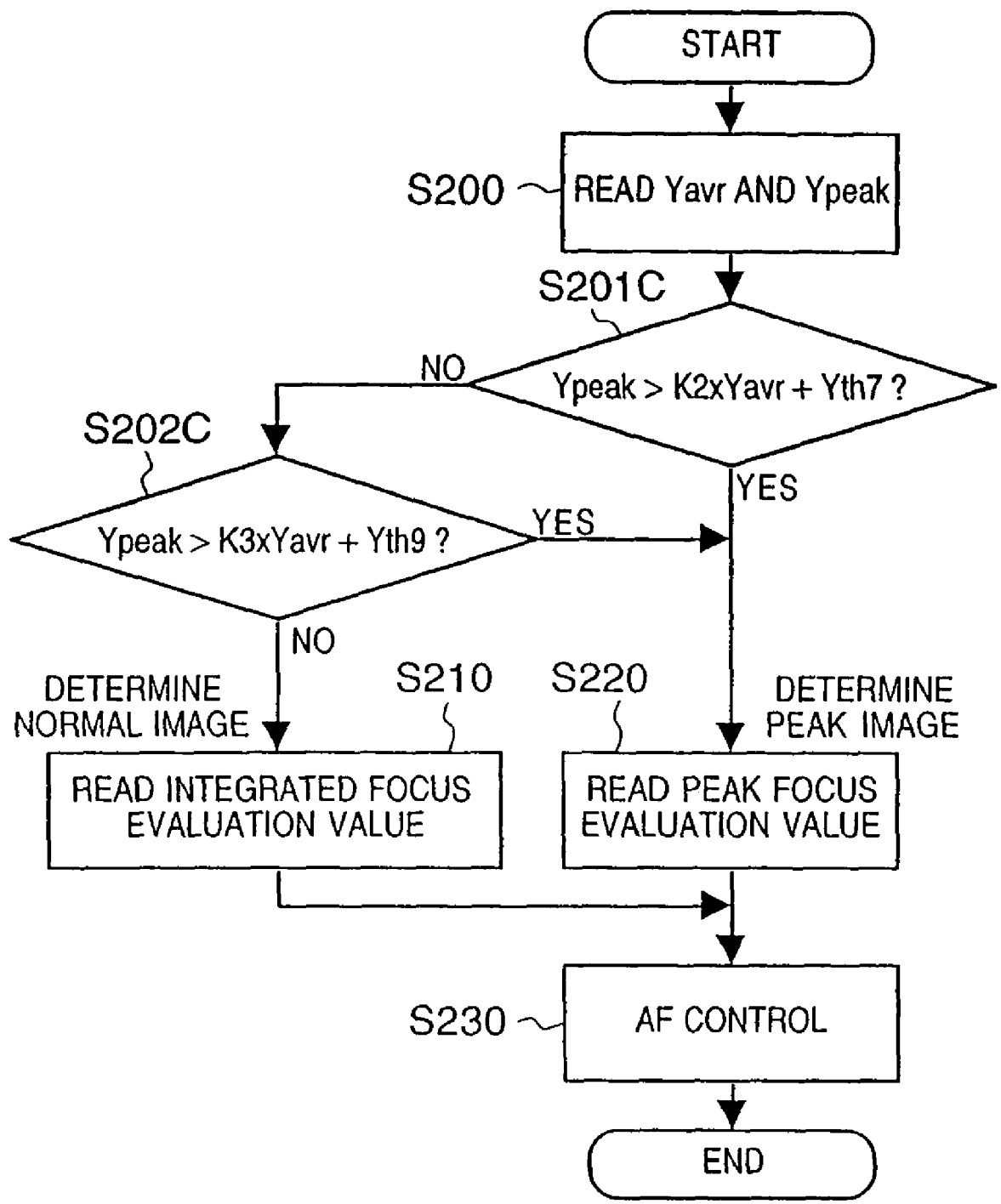
FIG. 6 is a flow chart showing a focus adjustment control sequence according to the third embodiment of the present invention.
Figure 7:
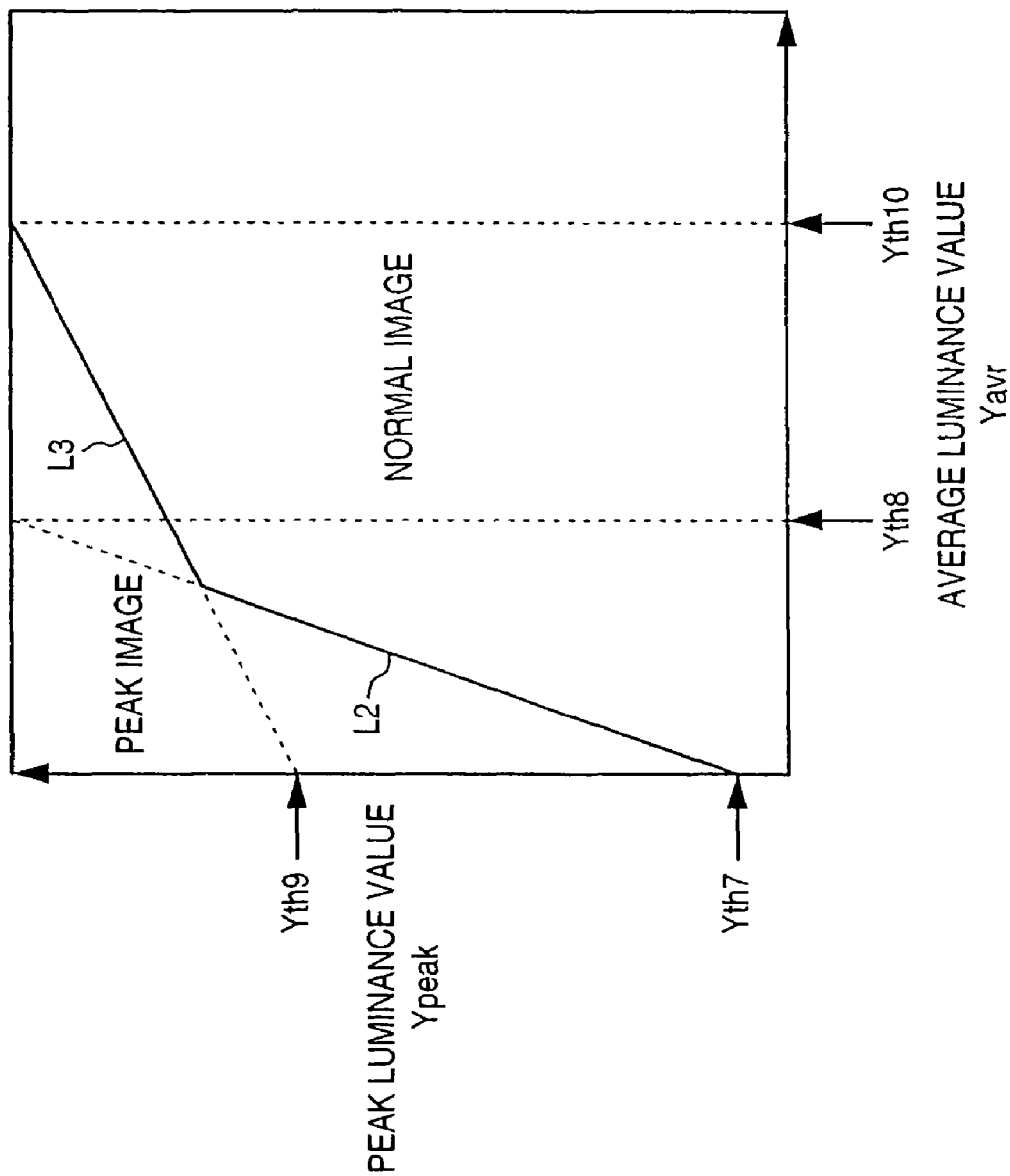
FIG. 7 is a graph for explaining a peak image discrimination scheme according to the third embodiment of the present invention.

FIG. 6 is a flow chart showing the focus adjustment control sequence according to this embodiment, and FIG. 7 is an explanatory view showing the peak image discrimination method. Step S200 and steps S210 to S230 in FIG. 6 are the same as those shown in FIG. 2 explained in the first embodiment.

When an average luminance value Yavr and peak luminance value Ypeak are read, it is checked if these average luminance value Yavr and peak luminance value Ypeak satisfy a first condition:

$$Ypeak > K2 \times Yavr + Yth7 \quad (3)$$

that is, if luminance data falls within a peak image region shown in FIG. 7 (step S201C). In inequality (3), the coefficient K2 is the ratio between the average luminance value Yavr and peak luminance value Ypeak, and corresponds to the slope of a straight line L2 in FIG. 7. Also, the predetermined value Yth7 corresponds to an offset of the straight line L2 shown in FIG. 7. In the third embodiment, if the peak luminance value Ypeak is expressed by 8-bit data, since the maximum level is 255, the slope K2 is given by:

$$K2=(255-Yth7)/Yth8 \quad (4)$$

If it is determined in step S201C that the luminance data fall within the peak image region that satisfies inequality (3), a peak focus evaluation value is read in step S220, and an AF process is executed in step S230.

On the other hand, if it is determined in step S201C that the luminance data do not satisfy inequality (3), it is checked in step S202C if the luminance data satisfy a second condition:

$$Ypeak>K3 \times Yavr+Yth9 \quad (5)$$

where the coefficient K3 is the ratio between the average luminance value Yavr and luminance peak value Ypeak, and corresponds to the slope of a straight line L3 in FIG. 7. Also, the predetermined value Yth9 corresponds to an offset of the straight line L3 shown in FIG. 7. In the third embodiment, if the peak luminance value Ypeak is expressed by 8-bit data, since the maximum level is 255, the slope K3 is given by:

$$K3=(255-Yth9)/Yth10 \quad (6)$$

If this second condition is satisfied, it is also determined that the object is a peak image. A peak focus evaluation value is read in step S220, and an AF process is done using the peak focus evaluation value in step S230. If the second condition is not satisfied either, it is determined that the object is a normal image. An integrated focus evaluation value is read in step S210, and an AF process is done using the integrated focus evaluation value.

As described above, according to the third embodiment, since the peak focus evaluation value is used in focus adjustment control for an object, such as a night scene, point light source, or the like (peak image) that poses a problem in the conventional integration AF method, since the peak focus evaluation value is used in focus adjustment control, accurate focus adjustment can be done even in a peak image. Since the integrated focus evaluation value is used in focus adjustment control for a normal image, stable focus adjustment can be assured.

Fourth Embodiment

The fourth embodiment of the present invention will be described below with reference to FIGS. 8 to 11.

Figure 8:
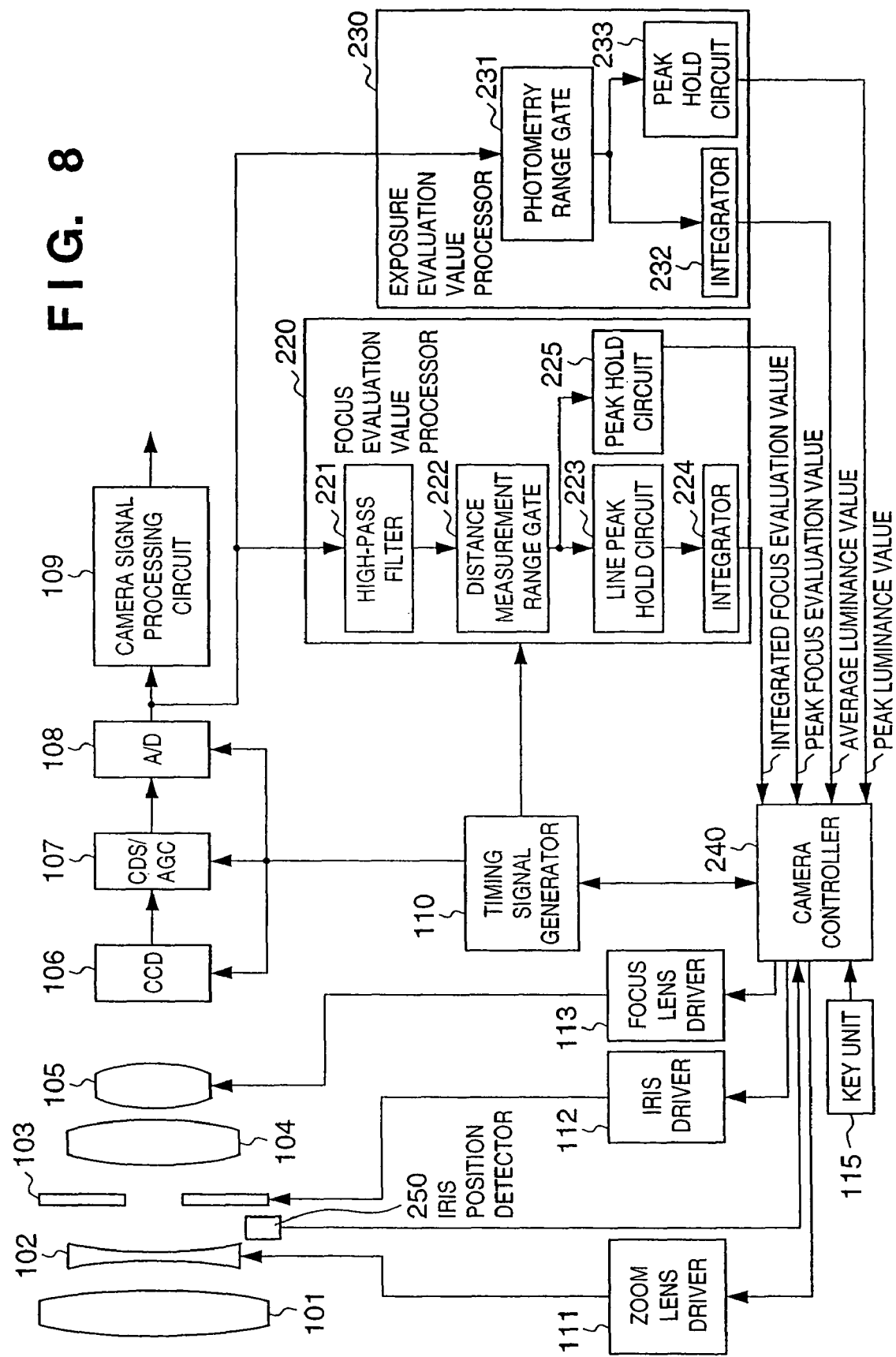
FIG. 8 is a block diagram showing an arrangement of a video camera system that adopts a focus adjustment method according to the fourth embodiment of the present invention.

FIG. 8 is a block diagram showing an arrangement of a video camera system according to the fourth embodiment. The same reference numerals in FIG. 8 denote the same parts as in the arrangement shown in FIG. 1, and a detailed description thereof will be omitted.

The fourth embodiment is characterized in that the output from an iris position detector 250 for detecting the aperture value of the iris, and zoom position information (focal length information) are used in peak image discrimination. The zoom position information can be detected based on a signal such as a stepping motor address for driving the zoom lens, which is output from the camera controller 240 to the zoom lens driver 111. On the other hand, the iris position detector 250 comprises a Hall element or the like, and outputs a voltage corresponding to the aperture value of the iris to the camera controller 240.

The reason why information of the iris and focal length is added to peak image discrimination will be explained below.

In general, the field depth decreases with increasing focal length; the field depth increases with decreasing focal length.

On the other hand, when the iris opens, the field depth decreases; otherwise, the focal depth increases. When the deviation of an object from the in-focus position remains the same, the defocus level becomes large when the field depth is shallow; the defocus level is small when the field depth is deep.

Figure 9:
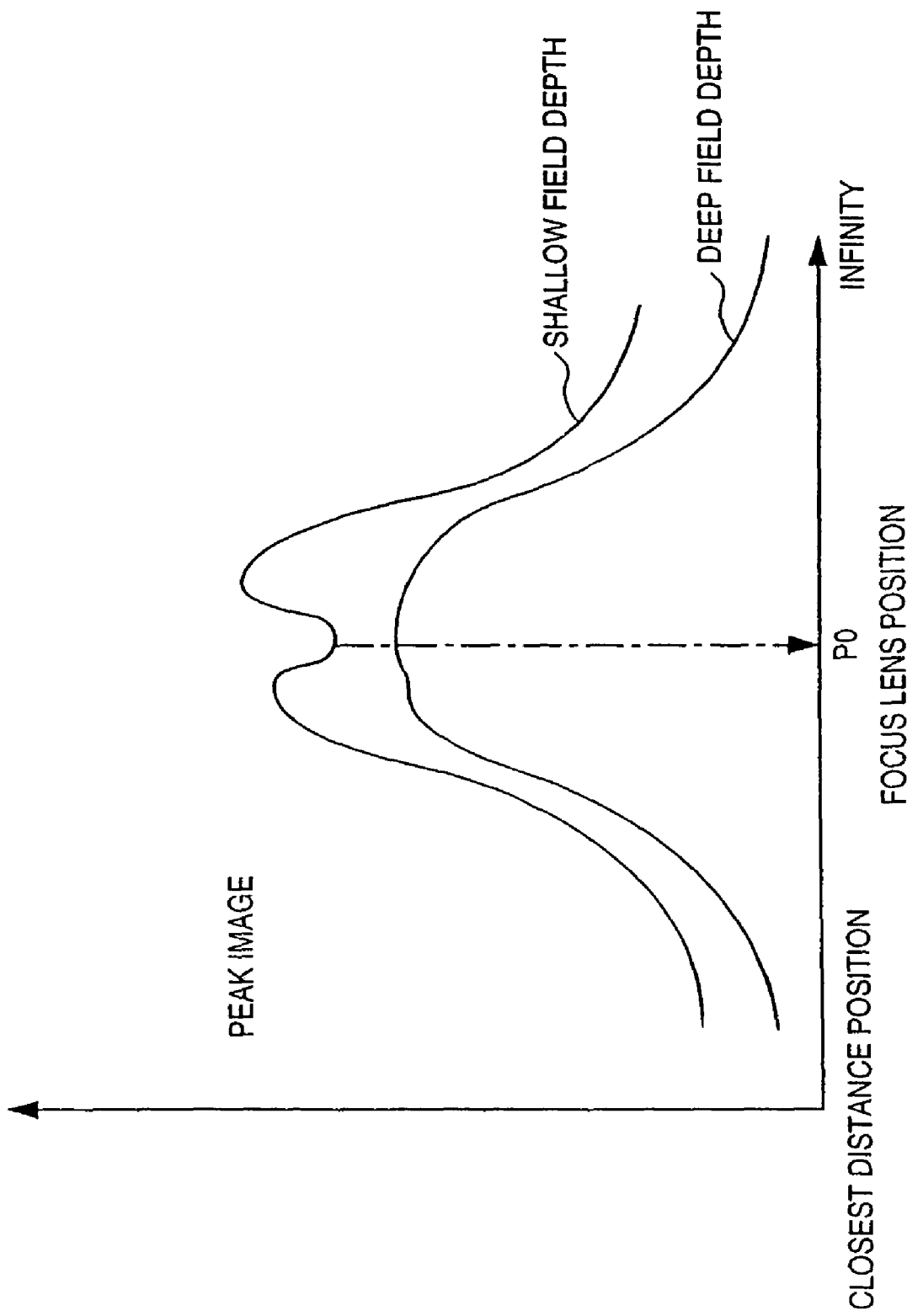
FIG. 9 is a graph showing the relationship between the field depth and integrated focus evaluation value in a peak image.

FIG. 9 shows the relationship between the field depth and integrated focus evaluation value in a peak image. As shown in FIG. 9, even in a peak image, when the field depth is deep, a peak of the integrated focus evaluation value appears at a correct in-focus position P0.

That is, even when it is determined based on the peak luminance value and average luminance value that the object is a peak image, if the field depth is deep, focus adjustment can be done using the integrated focus evaluation value, depending on the focal length and iris.

In the fourth embodiment, the output from the iris position detector 250 and zoom position information (focal length information) are used in peak image discrimination for the aforementioned reasons.

Figure 10:
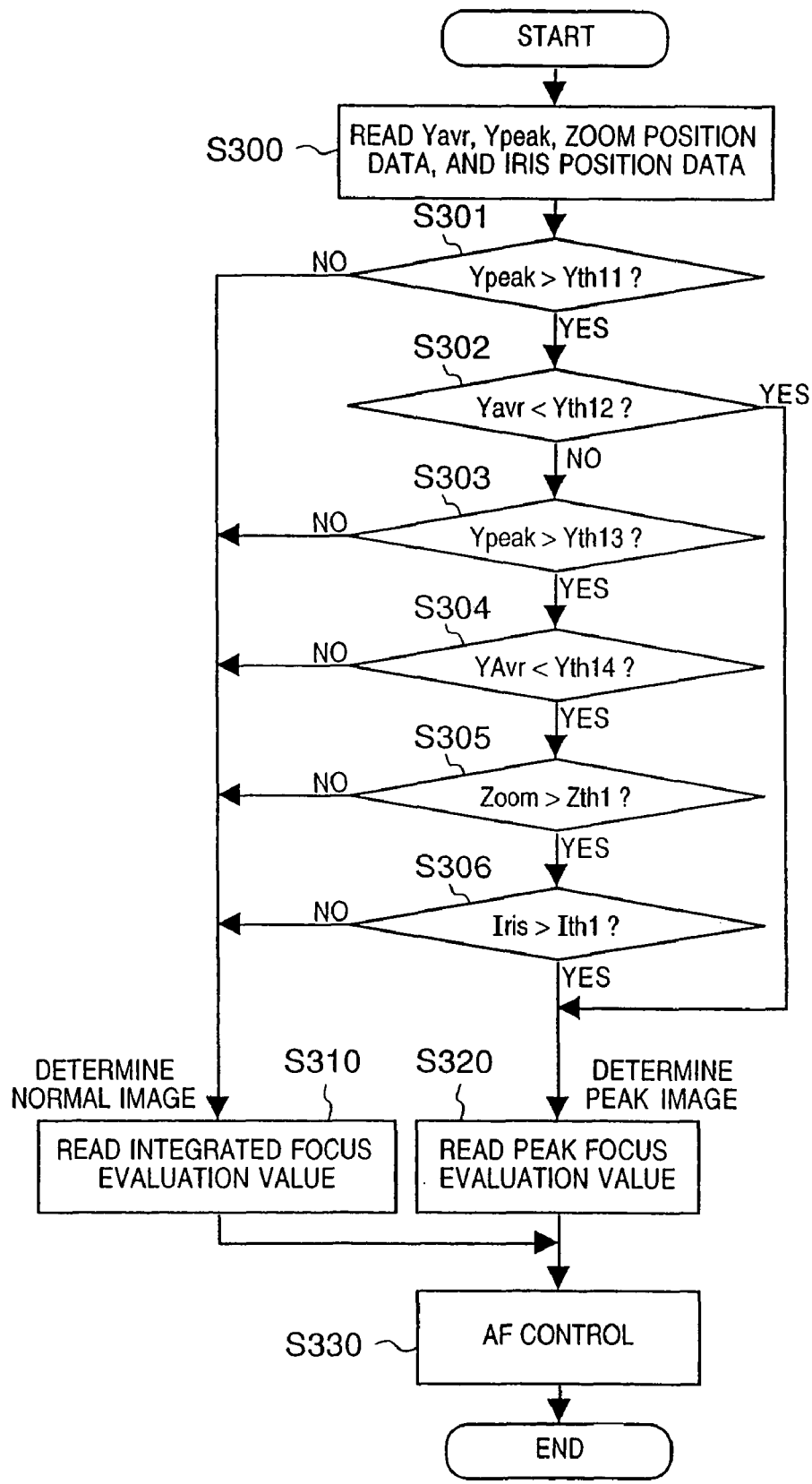
FIG. 10 is a flow chart showing a focus adjustment control sequence according to the fourth embodiment of the present invention.

FIG. 10 is a flow chart showing the focus adjustment process sequence according to the fourth embodiment.

A peak luminance value Ypeak, average luminance value Yavr, zoom position data, and iris position data are read (step S300). It is checked if the peak luminance value Ypeak is higher than a predetermined value Yth11 (step S301).

If it is determined that the peak luminance value Ypeak is lower than the predetermined value Yth11, since the object is unlikely to be a high-luminance object or point light source, it is determined that the object is a normal image irrespective of the iris and zoom states, and a process for reading an integrated focus evaluation value is executed (step S310). Then, focus adjustment is executed using the integrated focus evaluation value (step S330). The reason why neither the iris nor zoom states are considered in the result in step S301 is that such object with a low peak luminance value Ypeak is unlikely to be a peak image irrespective of the zoom and iris states.

If it is determined in step S301 that the peak luminance value Ypeak is higher than the predetermined value Yth11, it is checked if the average luminance value Yavr is very low, i.e., if the average luminance value is lower than a predetermined value Yth12 (step S302). If the average luminance value Yavr is lower than the predetermined value Yth12, it is determined that the object is a peak image irrespective of the iris and zoom states, a peak focus evaluation value is read (step S320), and focus adjustment is done using the peak focus evaluation value (step S330). The reason why neither the iris nor zoom states are considered is that the object is highly likely to be a peak image irrespective of the zoom and iris states.

If it is determined in step S302 that the average luminance value Yavr is higher than the predetermined value YTh12, it is checked if the peak luminance value Ypeak is higher than a predetermined value Yth13 which is higher than the predetermined value Yth11 (step S303), and if the average luminance value Yavr is lower than a predetermined value Yth14 larger than the predetermined value Yth12 (step S304). If the peak luminance value Ypeak is lower than the predetermined value Yth13 or if the average luminance value Yavr is higher than the predetermined value Yth14, it is determined that the object is a normal image. The process for reading an integrated focus evaluation value is executed in step S310, and focus adjustment is done using that integrated focus evaluation value in step S330.

If the peak luminance value Ypeak is higher than the predetermined value Yth13 and the average luminance value Yavr is lower than the predetermined value Yth14, the zoom position corresponding to the focal length is compared with a predetermined threshold value Zth1 to check if the zoom position (Zoom) is at the telephoto side with a long focal length (step S305). If the zoom position (Zoom) is smaller than the predetermined value Zth1, i.e., is not at the telephoto side, the process for reading an integrated focus evaluation value is executed in step S310, and focus adjustment is done using that integrated focus evaluation value in step S330.

If the zoom position is at the telephoto side, it is checked if the aperture value of the iris is larger than a predetermined threshold value Ith1 (step S306). If it is determined that the aperture value of the iris is smaller than the predetermined threshold value Ith1, the process for reading an integrated focus evaluation value is executed in step S310, and focus adjustment is done using that integrated focus evaluation value in step S330. On the other hand, if it is determined in step S306 that the aperture value of the iris is larger than the predetermined threshold value Ith1, since it is determined that the object is a peak image and the field depth is shallow, the process for reading a peak focus evaluation value is executed in step S320, and focus adjustment is done using the peak focus evaluation value in step S330.

Figure 11:
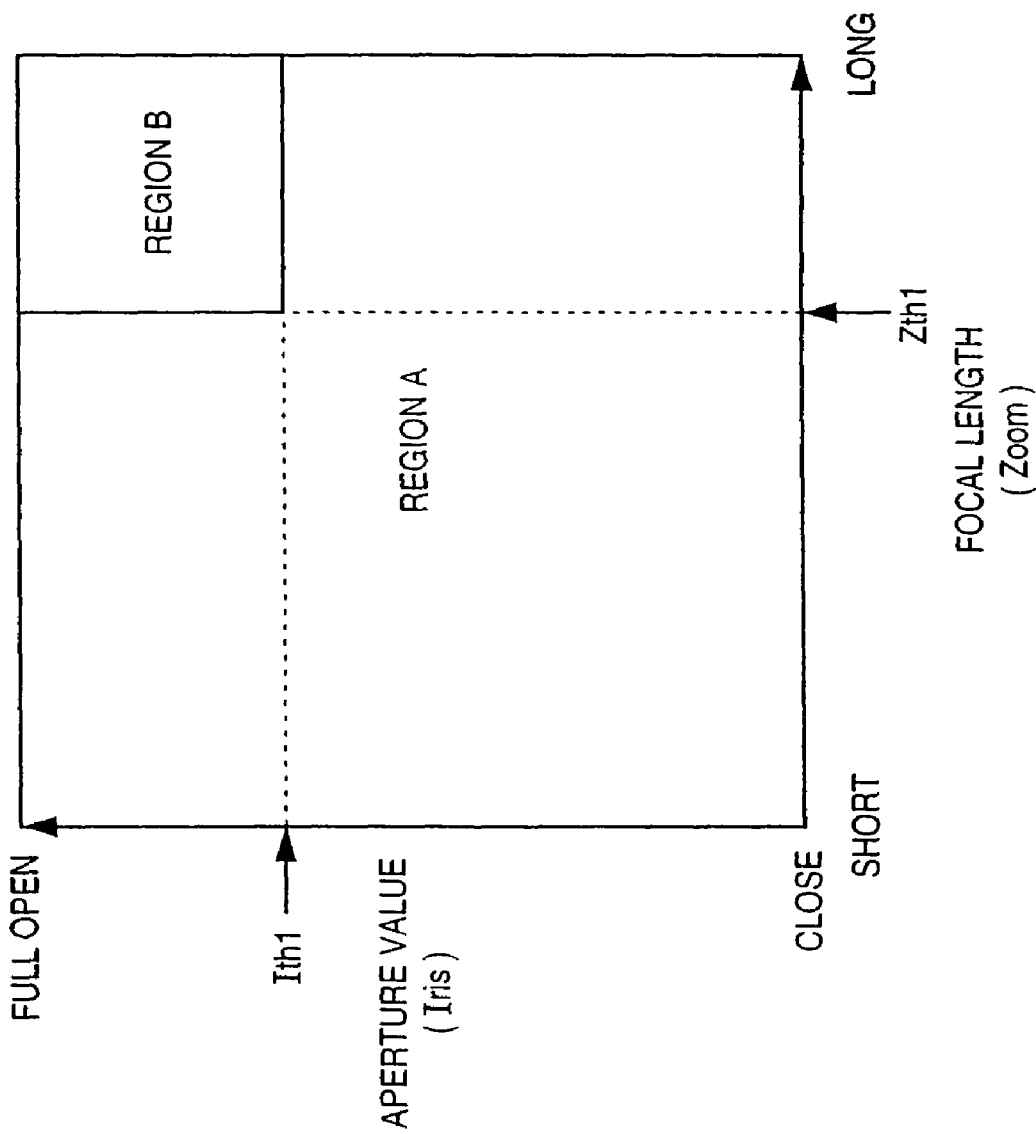
FIG. 11 is graph for explaining a peak image discrimination scheme according to the fourth embodiment of the present invention.

FIG. 11 is an explanatory view showing the peak image discrimination scheme in the aforementioned sequence. In FIG. 11, a region with a shallow field depth, which satisfies the conditions in steps S305 and S306, corresponds to region B.

As described above, according to the fourth embodiment, since the peak focus evaluation value is used in focus adjustment control for an object such as a night scene, point light source, or the like (peak image) that poses a problem in the conventional integration AF method, accurate focus adjustment is done even in a peak image. Since the integrated focus evaluation value is used in focus adjustment control for a normal image, stable focus adjustment can be assured. Furthermore, since the fourth embodiment refers to the zoom and iris position information, an object of a peak image, which is hard to discriminate using the integrated focus evaluation value, can be discriminated more accurately.

Fifth Embodiment

The fifth embodiment of the present invention will be described below with reference to FIGS. 12 and 13.

The fifth embodiment is characterized in that a peak image is discriminated based on a luminance signal using a scheme different from that in the fourth embodiment.

Figure 12:
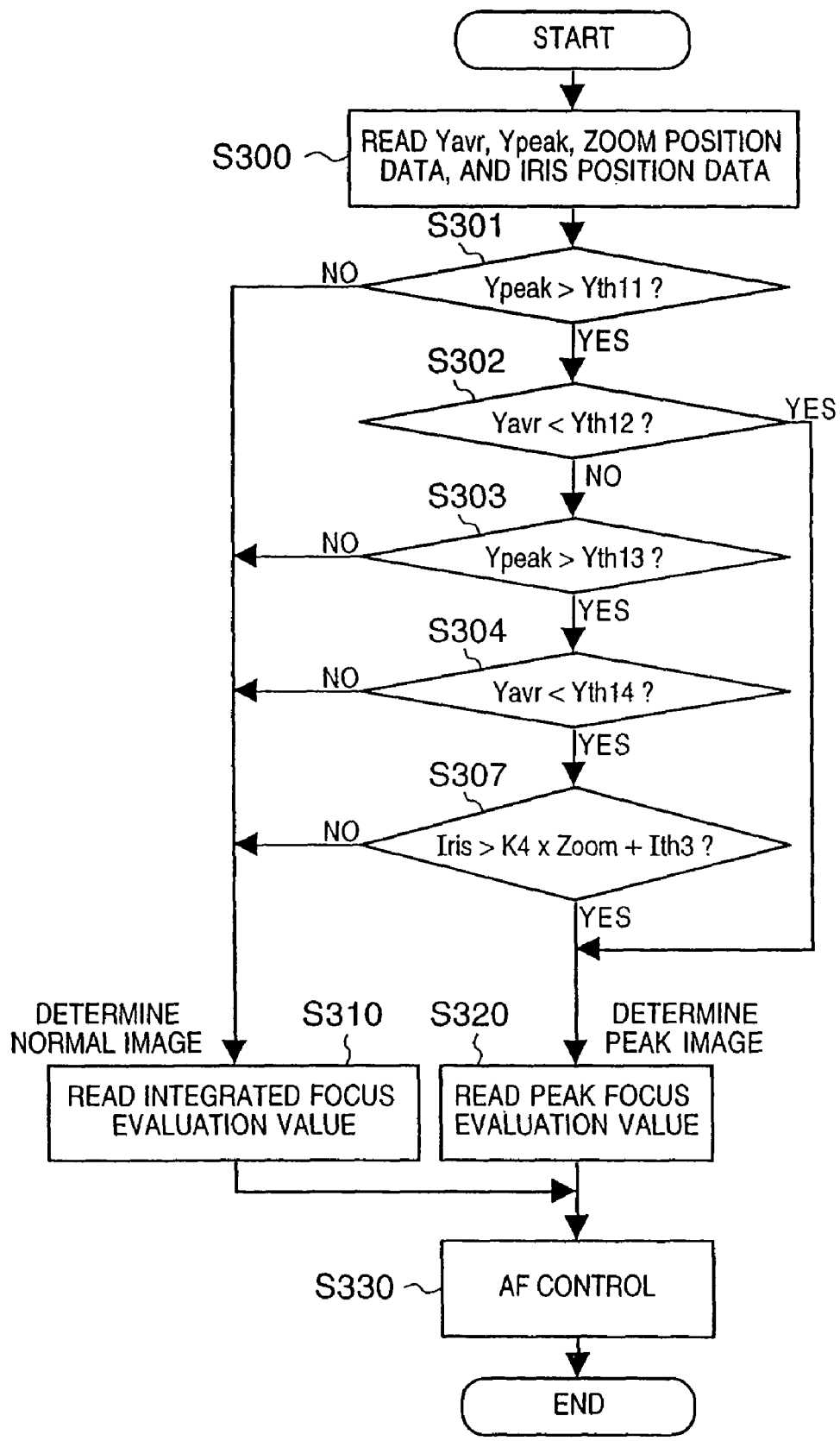
FIG. 12 is a flow chart showing a focus adjustment control sequence according to the fifth embodiment of the present invention.
Figure 13A:
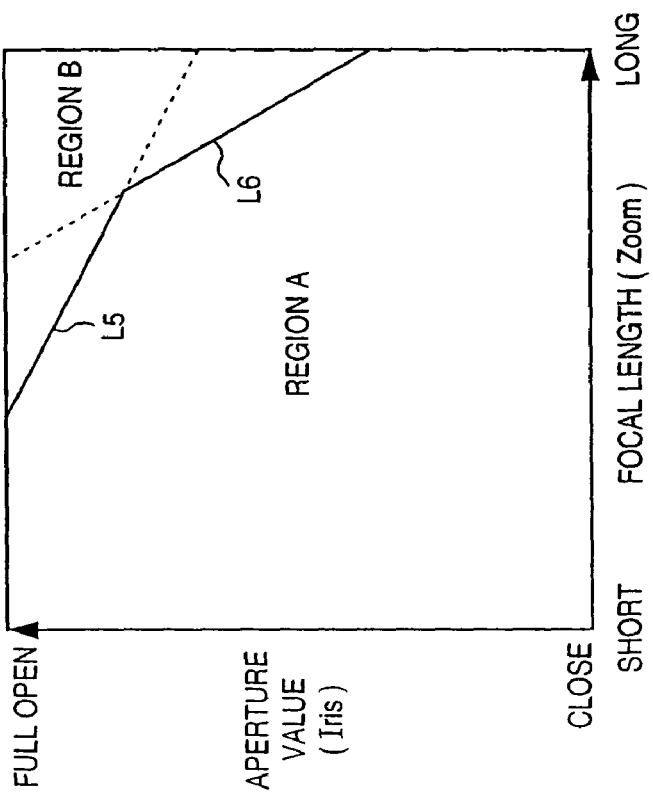
FIGS. 13A and 13B are graphs for explaining a peak image discrimination scheme according to the fifth embodiment of the present invention.
Figure 13B:
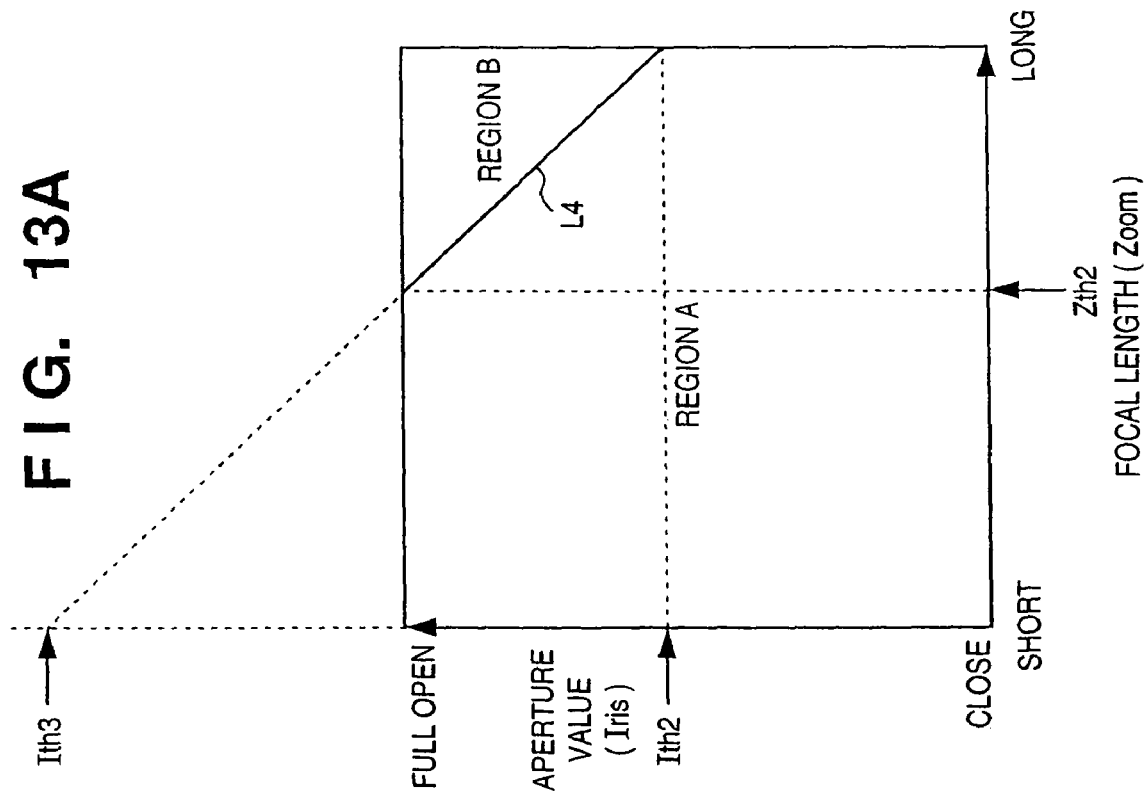

FIG. 12 is a flow chart showing the focus adjustment control sequence according to the fifth embodiment, and FIGS. 13A and 13B are explanatory views for explaining the peak image discrimination scheme. The processing sequence in steps S300 to S304 and steps S310 to S330 in FIG. 12 are the same as those in FIG. 10 explained in the fourth embodiment mentioned above.

If it is determined in step S304 that the average luminance value Yavr is lower than the predetermined value Yth14, it is checked in step S307 if the region of interest has a shallow field depth, i.e., if iris position data Iris and zoom position data Zoom satisfy:

$$\text{Iris} > K4 \times \text{Zoom} + I\text{th3} \tag{7}$$

where the coefficient K4 is the ratio between the zoom position data Zoom and iris position data Iris and corresponds to the slope of a straight line L4 shown in FIG. 13A, and Ith3 corresponds to an offset of the straight line L4. In the fifth embodiment, if the zoom position data and iris data are 8-bit data, since their maximum level is 255, the slope K4 is given by:

$$K4 = -(255 - I\text{th2})/(255 - Z\text{th2}) \tag{8}$$

If inequality (8) holds, it is determined that the field depth is shallow. This state corresponds to region B in FIG. 13A.

If the conditions in steps S301 to S304 are satisfied, and it is determined in step S307 that the field depth is shallow, since it is determined that the object is a peak image, a process for reading a peak focus evaluation value is executed in step S320, and focus adjustment is done using that peak focus evaluation value in step S330.

Even when the conditions in steps S301 to S304 are satisfied to determine that the object is a peak image candidate, if the condition in step S307 is not satisfied, since it is determined that the object is a normal image, the process for reading the integrated focus evaluation value is executed in step S310, and an AF process is done using that integrated focus evaluation value in step S330.

As described above, according to the fifth embodiment, since the peak focus evaluation value is used in focus adjustment control for an object such as a night scene, point light source, or the like (peak image) that poses a problem in the conventional integration AF method, accurate focus adjustment is done even in a peak image. Also, since the fifth embodiment refers to the zoom and iris position information, an object of a peak image, which is hard to discriminate using the integrated focus evaluation value, can be discriminated more accurately.

Note that the field depth discrimination method is not limited to that shown in FIG. 13A. For example, two conditions (peak image region discrimination using straight lines L5 and L6) may be used, as shown in FIG. 13B.

Other Embodiment

Note that, in the aforesaid embodiments, signals to be used for focus adjustment are formed from a high-frequency component of image signals within the same area by performing two signal forming methods for focus adjustment. However, signals to be used for focus adjustment may be formed from a high frequency component of image signals in two different areas in this invention.

Further, one of the two signals obtained by the two different signal forming methods for focus adjustment is selectively used, however, both of the two signals may be used by applying weights on these two signals, and signals formed by 3 or more different signal forming methods for focus adjustment may be used.

Further, in the above embodiments, the signal forming methods for focus adjustment are changed depending upon the result of photometry, however, other operations for focus adjustment, such as operation speed of lens for focus adjustment, may be changed.

Further, another evaluation photometry methods different from those disclosed in the above embodiments, and another signal forming method for focus adjustment and focus adjustment method different from those disclosed in the above embodiments may be used in this invention.

Further, both of the focal length and a state of an iris are taken into consideration upon peak image judgement, however, one of these may be taken.

Further, software configuration and hardware configuration disclosed in the above embodiments may be exchanged.

It should be noted that the present invention includes combinations of the aforesaid embodiments or technical elements disclosed therein.

Further, the present invention also includes an apparatus, formed by all or a part of the apparatuses disclosed in the embodiments of the present invention, which can be used either individually, with another apparatus, or within another apparatus.

Further, the present invention is applicable to: various types of cameras, such as an electronic camera for sensing a moving and/or a still image, a camera using a silver-halide film, a single-lens reflex camera, a leaf shutter camera, and a monitor camera; an image sensing apparatus other than cameras; an image reading apparatus; an optical apparatus; and the like; an apparatus applied to cameras, an image sensing apparatus, an image reading apparatus, an optical apparatus, and the like; elements forming the foregoing apparatuses; control method of the foregoing apparatuses; and a computer program product for providing the control method of the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An apparatus comprising:
    a photo-receiving device configured to receive an image of an object and output signals on the basis of the image;
    an obtaining device configured to obtain a first evaluation value and a second evaluation value on the basis of the signals from the photo-receiving device, the first evaluation value being obtained by integrating a part of the signals from the photo-receiving device, and the second evaluation value being obtained from peak signals of the part of the signals from the photo-receiving device; and
    a focus adjusting device configured to perform an operation for focus adjustment using the first evaluation value or the second evaluation value depending upon a peak luminance value and an average luminance value of the received image of the object,
    wherein, when a peak luminance value is lower than a predetermined peak value, the first evaluation value is used in the operation for focus adjustment, and
    wherein, when the peak luminance value is higher than the predetermined peak value and the average luminance value is lower than a predetermined average value, the second evaluation value is used in the operation for focus adjustment.

2. The apparatus according to claim 1, wherein said focus obtaining device forms a signal for the focus adjustment on the basis of the photo-received signal from said photo-receiving device.

3. The apparatus according to claim 2, wherein said focus obtaining device forms a signal for the focus adjustment by detecting sharpness of an object image.

4. The apparatus according to claim 1, wherein said focus obtaining device forms a signal for the focus adjustment by detecting sharpness of an object image.

5. The apparatus according to claim 1, wherein said apparatus comprises an image sensing apparatus.

6. The apparatus according to claim 1, wherein said apparatus comprises a camera.

7. The apparatus according to claim 1, wherein said apparatus comprises an optical device.

8. A focus adjusting method comprising:
    receiving an image of an object and outputting signals on the basis of the image using a photo-receiving device;
    obtaining a first evaluation value and a second evaluation value on the basis of the signals from the photo-receiving device, the first evaluation value being obtained by integrating a part of the signals from the photo-receiving device, and the second evaluation value being obtained from peak signals of the part of the signals from the photo-receiving device; and
    performing an operation for focus adjustment using the first evaluation value or the second evaluation value depending upon a peak luminance value and an average luminance value of the received image of the object,
    wherein, when a peak luminance value is lower than a predetermined peak value, the first evaluation value is used in the operation for focus adjustment, and
    wherein, when the peak luminance value is higher than the predetermined peak value and the average luminance value is lower than a predetermined average value, the second evaluation value is used in the operation for focus adjustment.

9. A non-transitory computer readable medium embedded with computer code that, when executed, causes a computer to carry out the steps of:
    receiving an image of an object and outputting signals on the basis of the image using a photo-receiving device;
    obtaining a first evaluation value and a second evaluation value on the basis of the signals from the photo-receiving device, the first evaluation value being obtained by integrating a part of the signals from the photo-receiving device, and the second evaluation value being obtained from peak signals of the part of the signals from the photo-receiving device; and
    performing an operation for focus adjustment using the first evaluation value or the second evaluation value depending upon a peak luminance value and an average luminance value of the received image of the object,
    wherein, when a peak luminance value is lower than a predetermined peak value, the first evaluation value is used in the operation for focus adjustment, and wherein, when the peak luminance value is higher than the predetermined peak value and the average luminance value is lower than a predetermined average value, the second evaluation value is used in the operation for focus adjustment.

10. The non-transitory computer readable medium according to claim 9, wherein said computer readable medium comprises a storage medium.

* * * * *